United States Patent
Ono et al.

(10) Patent No.: US 8,383,529 B2
(45) Date of Patent: Feb. 26, 2013

(54) CELLULOSE NONWOVEN FABRIC

(75) Inventors: Hirofumi Ono, Numazu (JP); Mikihiko Nakamura, Fuji (JP); Minoru Hayashi, Fuji (JP)

(73) Assignee: Asahi Kasei Kabushiki Kaisha, Osaka-shi (JP)

( * ) Notice: Subject to any disclaimer, the term of this patent is extended or adjusted under 35 U.S.C. 154(b) by 286 days.

(21) Appl. No.: 11/630,780

(22) PCT Filed: Jun. 30, 2005

(86) PCT No.: PCT/JP2005/012119
§ 371 (c)(1),
(2), (4) Date: Dec. 26, 2006

(87) PCT Pub. No.: WO2006/004012
PCT Pub. Date: Jan. 12, 2006

(65) Prior Publication Data
US 2007/0207692 A1    Sep. 6, 2007

(30) Foreign Application Priority Data

| | | |
|---|---|---|
| Jul. 1, 2004 | (JP) | 2004-195841 |
| Jul. 6, 2004 | (JP) | 2004-199042 |
| Dec. 2, 2004 | (JP) | 2004-349407 |
| Mar. 31, 2005 | (JP) | 2005-100445 |

(51) Int. Cl.
*D04H 1/00* (2006.01)
*D21C 9/00* (2006.01)

(52) U.S. Cl. ........ 442/327; 442/334; 442/339; 442/340; 162/1

(58) Field of Classification Search .................. 442/334, 442/340, 369, 414; 428/478.8
See application file for complete search history.

(56) References Cited

U.S. PATENT DOCUMENTS

| | | | |
|---|---|---|---|
| 6,060,289 A * | 5/2000 | Ishihara et al. | 435/101 |
| 6,074,523 A | 6/2000 | Mizobuchi et al. | |
| 6,103,790 A * | 8/2000 | Cavaille et al. | 524/13 |
| 6,413,674 B1 | 7/2002 | Mizobuchi et al. | |
| 6,706,086 B2 * | 3/2004 | Emig et al. | 55/486 |
| 2002/0148050 A1 * | 10/2002 | Luo et al. | 8/115.51 |

FOREIGN PATENT DOCUMENTS

| | | |
|---|---|---|
| JP | 56 100801 | 8/1981 |
| JP | 62-36467 | 2/1987 |

(Continued)

OTHER PUBLICATIONS

Park J.K. article titled "Bacterial Cellulose" copyright 2009 Woodhead Publishing retrieved from www.knovel.com.*

(Continued)

*Primary Examiner* — Jennifer A Steele
(74) *Attorney, Agent, or Firm* — Finnegan, Henderson, Farabow, Garrett & Dunner, L.L.P.

(57) ABSTRACT

Disclosed is a cellulose nonwoven fabric containing cellulose fibers having a maximum fiber diameter of not more than 1500 nm and a crystallinity determined by solid state NMR techniques of not less than 60%. The porosity of the cellulose nonwoven fabric is not less than 40% and not more than 99%.

8 Claims, 5 Drawing Sheets

FOREIGN PATENT DOCUMENTS

| | | | |
|---|---|---|---|
| JP | 6-43443 | | 6/1994 |
| JP | 8-49188 | | 2/1996 |
| JP | 9-129509 | | 5/1997 |
| JP | 10-125560 | | 5/1998 |
| JP | 10-140493 | | 5/1998 |
| JP | 2004-204380 | | 7/2004 |
| JP | 2004-270064 | | 9/2004 |
| JP | 2005-60680 | | 3/2005 |
| WO | WO 93/10172 | * | 5/1993 |
| WO | WO 03/040189 | A1 | 5/2003 |
| WO | WO 2004/016852 | | 2/2004 |

OTHER PUBLICATIONS

F. Herrick et al., "Microfibrillated Cellulose: Morphology and Accessibility," Journal of Applied Polymer Science: Applied Polymer Symposium 37, pp. 797-813 (1983).

The 13th Polymer Material Forum, The Society of Polymer Science, Japan, Preliminary Report Program, pp. 3 and 19-20 (2004).

Supplementary European Search Report for corresponding EP Application No. 05765342.0 dated Aug. 25, 2010.

* cited by examiner

CELLULOSE NONWOVEN FABRIC

TECHNICAL FIELD

The present invention relates to a cellulose fiber and a nonwoven fabric containing the fiber.

BACKGROUND ART

As can be seen in the recent worldwide efforts directed toward nanotechnology, as a trend in the materials development, there can be mentioned one which is focused on a smaller structural unit and aims at controlling the structure. In such a technical trend, the present inventors have conducted researches on the sheet forming technology of microfibrilated cellulose (hereinafter abbreviated as MFC) obtained by using as a raw material a natural cellulose such as a pulp which contains an abundance of fibers having a thickness of 1 μm or less as disclosed in Patent Document 1 and Non-Patent Document 1 and that of a fine and highly crystalline cellulose nanofiber having a fiber diameter in a range of about several nm to 200 nm produced by acetic acid bacteria disclosed in Patent Document 2 (bacterial cellulose, hereinafter abbreviated as BC).

It has been known that a sheet comprising cellulose fibers having such minute fiber diameters has very unique material characteristics such as an extremely high mechanical strength as described in Non-Patent Document 2 and at the same time an extremely low linear expansion coefficient as disclosed in Patent Document 3 and Patent Document 4. It is described in Patent Document 3 and Patent Document 4 that a hybridized material in which spaces therebetween are filled with a resin exhibits a low linear expansion coefficient.

In addition, Patent Document 5 has recently disclosed that a hybrid film in which an epoxy resin or an acrylic resin is hybridized with a BC sheet obtained by compressing and then drying a BC gel obtained by static culture has a low linear expansion coefficient as well as high transparency, and therefore it is effective as an optical film and an optical substrate.

However, according to Patent Document 5, for example, since the BC sheet from static culture is a sheet having a very dense structure, it takes an extremely long time in the hybridization step to impregnate a cellulose fiber sheet having a porosity of about 30% with a resin monomer, which requires impregnation under reduced or increased pressure (for example, by carrying out impregnation for 12 hours under a reduced pressure of 0.08 MPa), and therefore it has been disadvantageous from a viewpoint of industrial production.

Besides, the cellulose fiber sheet mainly contributing to the realization of low linear expansion coefficient in the art disclosed by the document is intrinsically a hygroscopic material, and, accordingly it has a property to easily cause changes in physical properties when absorbing moisture. Therefore, there was a demand to reduce the fraction of BC or cellulose as much as possible in a hybrid film to a level which could maintain the feature of low linear expansion coefficient. In other words, this is a demand to increase the ratio of volume occupied by pores (porosity) to which a resin can impregnate in a cellulose nonwoven fabric.

In the meantime, as is disclosed in Patent Document 6 and Patent Document 7, the cellulose nonwoven fabrics comprising nanofibers as described above can be expected to function as a separator in an electric storage device and have high filtering properties such as those of a HEPA filter due to the fine network structure made by nanofibers. In such a field, nonwoven fabrics are required to have filter performance to intercept minute substances as well as high air permeability.

In order to satisfy these requirements at the same time, a technology to control the pores of the sheet to a minute size while increasing the porosity has been needed. A technology to form a nonwoven sheet with fibers of a minute fiber diameter such as nanofibers was paid attention in Patent Document 6 and Patent Document 7 as the measures to solve the requirements.

From the viewpoint mentioned above, a technology to provide a nonwoven fabric comprising BC or fine cellulose fibers which can be a material of a matrix of hybrid film, a separator or a functional filter is expected, and the use of a static culture sheet of BC can be considered as one of the solutions thereof as described in Patent Document 5. However, when the nonwoven fabric is produced, it is desirable to conduct the production not by a batch process but by a continuous production process both from the viewpoint of industrial productivity and from the viewpoint of degree of freedom of applications of the product and therefore, the use of the static culture sheet of BC was in disadvantageous situation particularly because from the viewpoint of production process. This is because when the static culture sheets of BC are continuously produced, there arises a problem in the point of productivity due to the slow sheet forming rate (it usually needs time period of around 5 days to form sheets from a static culture gel having a sheet thickness of around 1 cm), and because there is no technology to continuously produce such a slowly produced sheet while controlling high quality. A technology to form sheets from nanofibers by an industrially applicable artificial process has been demanded.

As a technology to industrially produce nonwoven fabrics comprising nanofibers such as BC, Patent Document 7 and Patent Document 8 describe Examples of forming sheets from BC by a paper making process which is a production process of paper. Furthermore, there is disclosed in Patent Document 9 a paper making sheet forming technology of MFC corresponding to subnanofibers obtained by making fine wood pulp.

However, although these documents describe sheet forming processes of BC and MFC, they mainly emphasize only on a drying method as an important point to pay attention as compared to the case where fibers derived from pulp used for normal paper making are used and do not describe any particular point to take notice for the other steps. In fact, when relatively thin nonwoven fabrics suitable, for example, for a separator of electric storage devices are attempted to produce based on the information disclosed in these documents by performing paper making of nanofibers such as BC, it was difficult to produce high quality nonwoven fabrics having no pinhole and high uniformity stability and with high efficiency using an existing paper machine.

The uniformity referred to here means whether the distribution of sheet thickness is uniform or not at a resolution level of several mm to 10 mm at least for the sheet surface. For example, when the nonwoven fabric is used as a separator for electric storage devices mentioned above, relatively thin films having a size of about several mm as the minimum value of a slit width (in the case of tape-like form) or a diameter (in the case of a circular film) and a sheet thickness of 60 μm or less are often used. For such a use, homogeneity in physical properties (strength, air permeability, etc.) of a film by this size unit is required. Particularly when a film is a thin nonwoven fabric, the homogeneity in physical properties of the film can be approximately expressed as equivalent to the uniformity of sheet thickness. In addition, when the nonwoven fabric is used as the base material of an optical substrate mentioned above, it is natural that the optical uniformity of the substrate sheet surface is required at a high level, and for that purpose high sheet uniformity of the nonwoven fabric which was a base material was demanded.

That is, it has been necessary to solve some problems mentioned above to enable to commercially provide a nonwoven fabric comprising fine cellulose fibers as a material having the high function described above with a quality applicable to the fields in which the characteristics thereof are made good use of.

Patent Document 1: JP-A-56-100801
Patent Document 2: JP-B-6-43443
Patent Document 3: WO03/040189
Patent Document 4: JP-A-2004-270064
Patent Document 5: JP-A-2005-60680
Patent Document 6: JP-A-9-129509
Patent Document 7: J P-A-2004-204380
Patent Document 8: JP-A-10-125560
Patent Document 9: JP-A-10-140493
Non-Patent Document 1: J. Appl. Polym. Sci. Appl. Polym. Symp. 37, 797-813 (1983)
Non-Patent Document 2: 13th Polymer Materials Forum Preprints, pp. 19-20(2004)

DISCLOSURE OF THE INVENTION

An object of the present invention is to provide a fine cellulose fiber which can utilize properties intrinsic to cellulose such as a high mechanical strength and high heat resistance (chemical stability and dimensional stability in a high temperature range), to the full extent and to provide a cellulose nonwoven fabric comprising the same and having an excellent sheet uniformity, a high porosity (more than 40%) and a fine network. Such a cellulose nonwoven fabric enables to provided highly transparent base materials for producing composite materials which are excellent in processing characteristics to be hybridized with the other materials and can be used as optical materials.

The present inventors have conducted intensive studies in order to solve the above problems, and consequently have found at first that it is necessary to decrease the maximum fiber diameter of fibers which constitute a film or fibers (solid or dispersion) as raw materials and to use the fibers with high crystallinity as a required performance which is necessary to a base material for producing a composite material for optical use. The present inventors have also found that presence of a very small amount of impurities such as lignin, polysaccharides other than cellulose or protein contained in purified natural cellulose or chlorine or chlorine containing compounds contained at the time of purification significantly interferes the characteristics such as high heat resistance which cellulose originally has. Furthermore, the present inventors have found some of the basic conditions for stably obtaining a high quality nonwoven fabric using cellulose fibers having a small maximum fiber diameter, a high crystallinity and little impurities and thereby completed the present invention.

That is, the present invention is:

[1] A cellulose nonwoven fabric having a porosity of not less than 40% and not more than 99% which comprises cellulose fibers having a maximum fiber diameter of 1,500 nm or less and a crystallinity determined by solid state NMR techniques of 60% or more.

[2] The cellulose nonwoven fabric according to above [1], wherein the nonwoven fabric has an average transmittance $Tr,av$ of 0.70 or more, which is defined by the following formula (1) and determined by scanning a light with a wavelength of 850 nm perpendicularly to the nonwoven fabric immersed in toluene.

(wherein $Tr,av$ is defined by the following formula with a ratio between $Tr,1$, an average value of transmittances obtained by filling toluene in a test tube in a condition that the nonwoven fabric is stuck to an inside wall thereof, irradiating a light with a wavelength of 850 nm to the test tube in a direction perpendicular to the nonwoven fabric, and scanning each 40-μm length along the test tube in a lengthwise direction thereof to the total length of 30,000 μm (number of data: 750), and $Tr,2$, an average value of transmittances obtained by performing the same measurements except that the nonwoven fabric is removed and only toluene is placed in the test tube).

$$Tr,av=Tr,1/Tr,2 \qquad (1)$$

[3] The cellulose nonwoven fabric according to above [2], wherein the average transmittance defined by the above formula (1) is 0.80 or more.

[4] The cellulose nonwoven fabric according to any one of above [1] to [3], wherein the nonwoven fabric has a sheet uniformity parameter H of 0.040 or less, which is defined by the following formula (2). (wherein H is defined by the following formula with $Tr,sd$ defined by a difference between $Tr,sd1$, a standard deviation of transmittances obtained by filling toluene in a test tube in a condition that the nonwoven fabric is stuck to an inside wall thereof, irradiating a light with a wavelength of 850 nm to the test tube in a direction perpendicular to the nonwoven fabric, and scanning each 40-μm length along the test tube in a lengthwise direction thereof to the total length of 30,000 μm (number of data: 750), and $Tr,sd2$, a standard deviation of transmittances obtained by performing the same measurements except that the nonwoven fabric is removed and only toluene is placed in the test tube, and $Tr,av$ obtained by the above formula (1) from the measurements.

$$H=Tr,sd/Tr,av \qquad (2)$$

wherein $Tr,sd=Tr,sd1-Tr,sd2$.

[5] The cellulose nonwoven fabric according to any one of above [1] to [4], wherein the dried nonwoven fabric has a sheet non-uniformity parameter H' of 0.20 or less, which is defined by the following formula (3).

$$H'=T'r,sd/T'r,av \qquad (3)$$

(wherein $T'r,aV$ and $T'r,sd$, respectively, mean an average value and a standard deviation of all Tr values obtained by irradiating a light with a wavelength of 850 nm perpendicular to a dried sheet surface, and measuring Tr for each 40-μm length along the sheet surface in a linear direction thereof to the total length of 30,000 μm (number of data: 750)).

[6] The cellulose nonwoven fabric according to any one of above [1] to [5], wherein the nonwoven fabric has an air permeability not less than 5 s/100 ml and not more than 900 s/100 ml, a sheet thickness not less than 5 μm and not more than 100 μm, and porosity range not less than 70% and not more than 99%.

[7] The cellulose nonwoven fabric according to any one of above [1] to [5], wherein the nonwoven fabric has an air permeability not less than 1000 s/100 ml, a sheet thickness not less than 5 μm and not more than 100 μm, and a porosity range not less than 40% and not more than 65%.

[8] A cellulose fiber as a raw material for the cellulose nonwoven fabric according to any one of above [1] to [7], wherein the cellulose fiber has a maximum fiber diameter of 1,500 nm or less and a crystallinity determined by solid state NMR techniques of 60% or more.

[9] The cellulose fiber according to above [8], wherein the cellulose fiber has a number average fiber diameter of 200 nm or less.

[10] The cellulose fiber according to above [8] or [9], wherein the cellulose fiber has a nitrogen content of 0.4% by weight or less and a total organic carbon (TOC) content of 60 ppm or less, which is freely present in water 24 hours after 10 g of the fiber is immersed in 100 g of the water at 4° C.

[11] The cellulose fiber according to any one of above [8] to [10], wherein the cellulose fiber has a chlorine content of 40 ppm or less.

[12] The cellulose fiber according to any one of above [8] to [11], wherein the cellulose is a fine cellulose fiber derived from cotton.

[13] The cellulose fiber according to above [10] or [11], wherein the cellulose is a bacterial cellulose.

[14] A dispersion for paper making or coating comprising the cellulose fiber according to any one of above [8] to [13] and a dispersant.

[15] A process for producing the cellulose nonwoven fabric according to any one of above [1] to [7], comprising forming a sheet from a dispersion containing cellulose fibers by a paper making process or a coating process.

[16] The process according to above [15], wherein the sheet is formed by the paper making process, and the paper making process comprises use of: a dispersion for paper making in which the cellulose fibers have a dispersed average diameter not less than 1 μm and not more than 300 μm and a concentration not less than 0.01% by weight and not more than 1.0% by weight; and a filter cloth having a capacity of separating 95% or more of cellulose fibers in the dispersion for paper making by filtration under atmospheric pressure at 25° C. and a water permeation of 0.005 ml/cm$^2$·s or more under atmospheric pressure at 25° C., wherein the process comprises: setting the filter clothe on wires of a paper making machine; filtering the dispersion for paper making on the filter cloth to deposit cellulose fibers on the filter cloth and thereby producing a wetted nonwoven fabric containing 4% by weight or more of solid content of the cellulose fivers; and peeling off the nonwoven fabric from the filter cloth before or after a drying step.

[17] The process according to above [16], wherein the filter cloth is a nonwoven fabric or a textile containing organic polymer fibers or a porous sheet containing an organic polymer.

[18] The process according to any one of above [15] to [17], comprising a step of displacing a dispersant in the dispersion for paper making by an organic solvent before the drying step.

[19] The process according to any one of above [15] to [18], wherein the cellulose nonwoven fabric is produced to have a sheet thickness in the range of 5 μm or more and 200 μm or less by continuously forming sheets from the cellulose fibers.

[20] The process according to any one of above [15] to [19], wherein the cellulose fibers are obtained by subjecting cellulose fibers immersed in water or an aqueous solution to a high-temperature treatment at 100° C. or more for one hour or more as a step prior to a finely pulverizing treatment, followed by dispersing wet cellulose obtained by removing the water or the aqueous solution in water again and conducting the finely pulverizing treatment by a high pressure homogenizer and/or a super-high pressure homogenizer and/or a grinder.

[21] A process for producing the cellulose fiber according to above [8], comprising a step of performing a finely pulverizing treatment by subjecting cellulose fibers having a crystallinity determined by solid state NMR techniques of 60% or more immersed in water or an aqueous solution to a high-temperature treatment at 100° C. or more for one hour or more as a step prior to the finely pulverizing treatment, and a step of dispersing wet cellulose obtained by removing the water or the aqueous solution in water again and conducting the finely pulverizing treatment by a high pressure homogenizer and/or a super-high pressure homogenizer and/or a grinder so that a maximum fiber diameter may be 1,500 nm or less.

The cellulose fiber of the present invention is extremely excellent as a raw material for a nonwoven fabric having a high heat resistance, a high mechanical strength and a finely pored structure. In addition, the nonwoven fabric made from the fiber of the present invention is excellent in sheet uniformity and has a fine network with high porosity. Since the nonwoven fabric in itself is a material having an extremely low thermal expansion (low linear expansion coefficient), when the nonwoven fabric of the present invention is hybridized with the other material such as a resin, a composite material of low linear expansion coefficient can be provided and since the material has a fine network, a highly transparent composite which can be employed as an optical material can be obtained. Furthermore, although it is a nonwoven fabric, it is effective as a functional film having very small pore diameters.

BEST MODE FOR CARRYING OUT THE INVENTION

Next, the present invention is described in detail.

It is necessary that the cellulose fiber of the present invention should be consisted of fibers of small fiber diameters. More specifically, it is necessary not to contain fibers having a fiber diameter of a certain value or more, and the maximum fiber diameter of fibers constituting fiber raw materials or nonwoven fabrics is 1,500 nm or less, preferably 1,000 nm or less, and more preferably 500 nm or less from a viewpoint of preferably exhibiting a function of the nonwoven fabrics of the present invention.

If the maximum fiber diameter is 1,500 nm or less, a nonwoven fabric will consist of fine networks and it will have a high performance (high fine particle trapping performance and anti-short resistance) as a highly functional filter and a separator of electric storage device. In addition, when the nonwoven fabric of the present invention is hybridized with a resin, since extremely high transparency can be expected in the composite, it can be suitably used as a film or a sheet-like shaped article whose application can encompass optical use.

Whether the maximum fiber diameter of the cellulose fiber of the present invention is 1,500 nm or less is confirmed by an SEM image as follows. That is, observation by scanning an electron microscope (SEM) at magnification of 10,000 times equivalence is performed on the surface of the cellulose fiber (solid state) or the nonwoven fabric of the present invention at three points at random. When no fiber having a fiber diameter more than 1,500 nm can be recognized in all the obtained SEM images, it is defined that the maximum fiber diameter is 1,500 nm or less. However, when it can be definitely confirmed that several fine fibers constitute a bunch having a fiber diameter more than 1,500 nm in the image, it shall not be considered as fibers having the maximum fiber diameter more than 1,500 nm.

Figure 1:
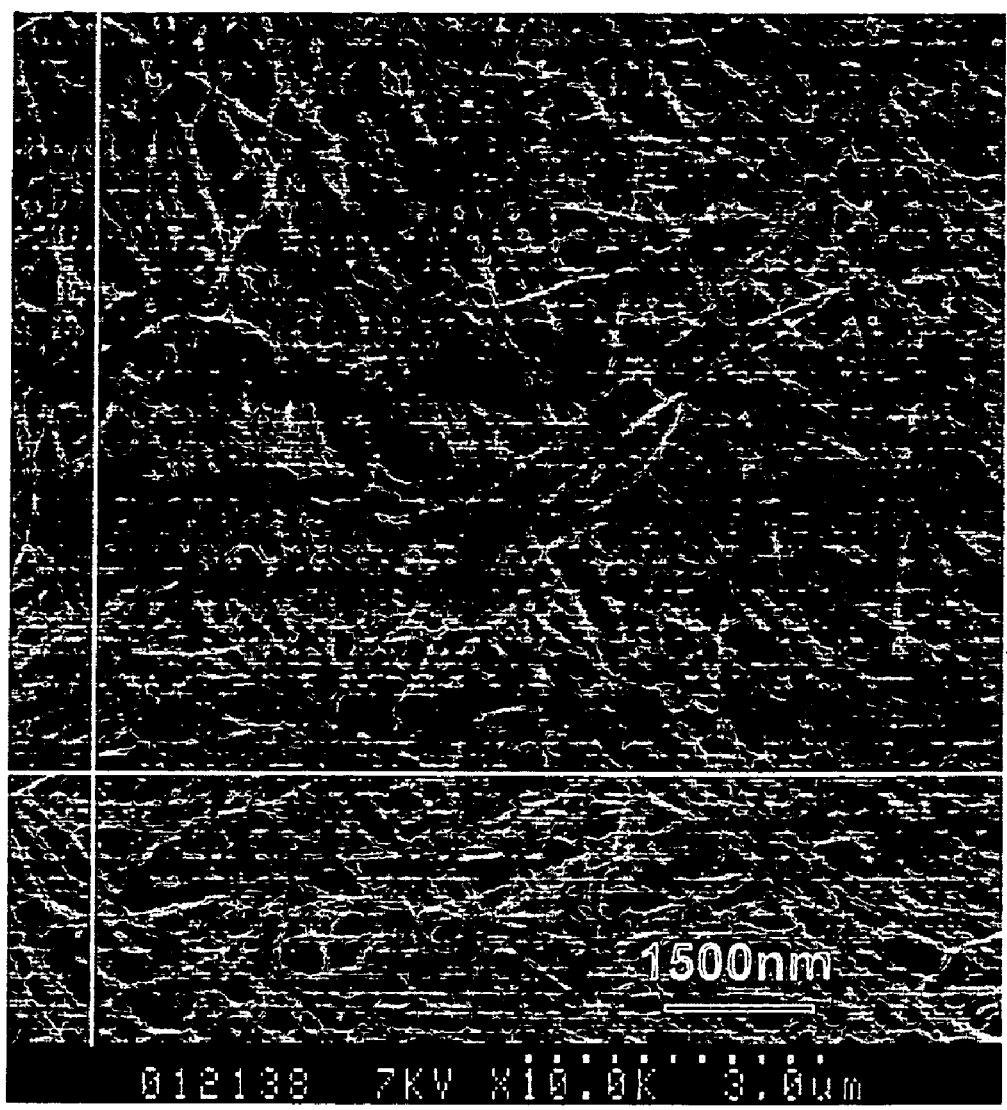
FIG. 1 is an SEM image of a nonwoven fabric obtained by paper making method from BC produced by CJF002 bacteria.
Figure 2:
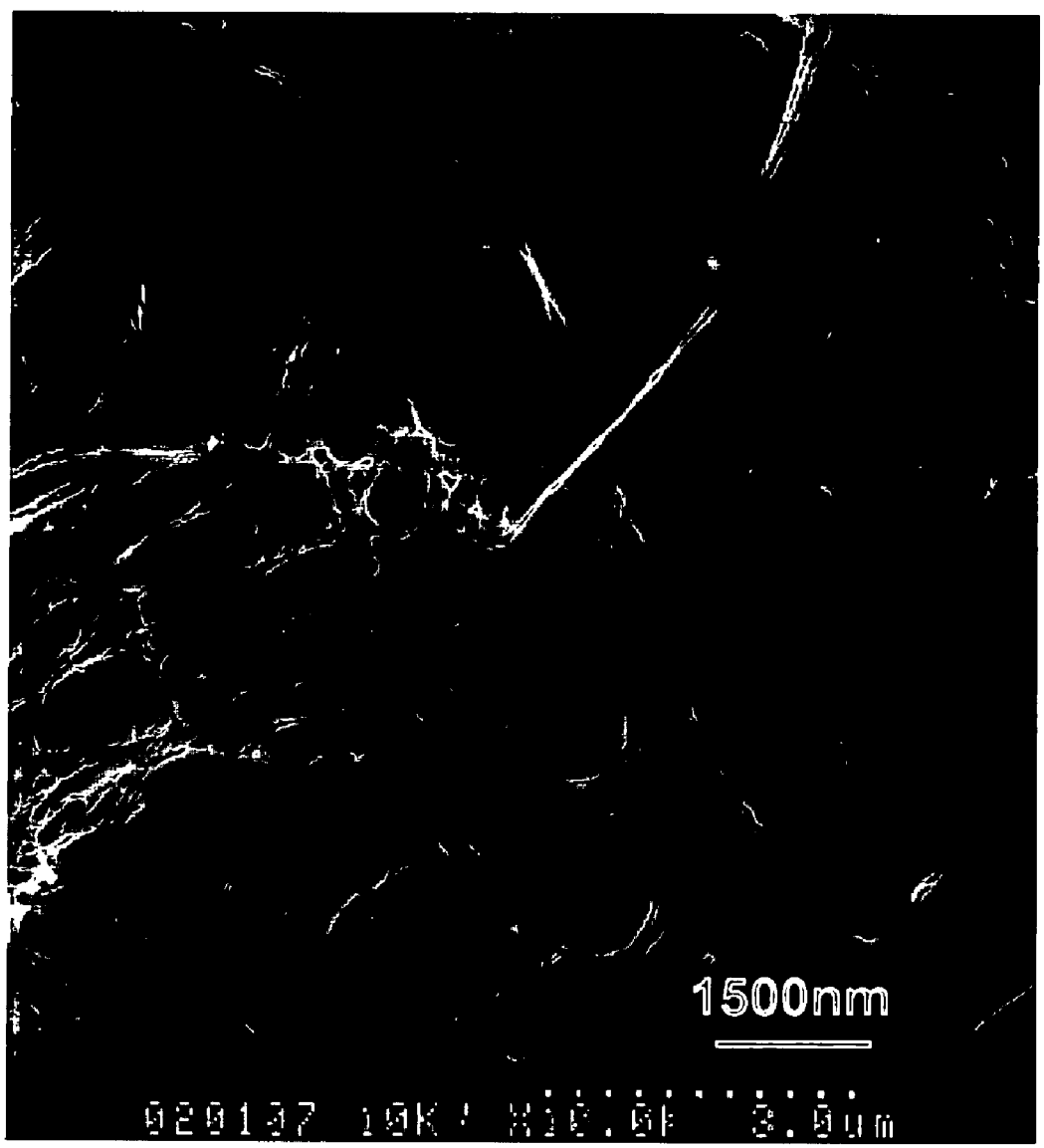
FIG. 2 is an SEM image of a nonwoven fabric obtained by paper making method from finely pulverized cotton linters fiber.

Examples of such measurement are shown in FIGS. 1 and 2. FIG. 1 is an SEM image of a nonwoven fabric obtained by a paper making process from BC produced by CJF002 bacteria which is similar to *Enterobacter*, and FIG. 2 is an SEM image of a nonwoven fabric also obtained by a paper making process from fine linters fibers obtained by subjecting purified cotton linters to a high pressure homogenizer treatment (100 MPa×20 passes). Both the nonwoven fabrics are nonwoven fabrics falling under the present invention because there is obviously no fiber having a fiber diameter surpassing the standard bar of 1,500 nm shown in the drawings.

It is preferable that a number average fiber diameter of the cellulose fiber of the present invention is 200 nm or less, more preferably 160 nm or less, and most preferably 120 nm or less from a viewpoint of easiness to create a finely pored structure.

The number average fiber diameter of cellulose fiber is defined as follows. That is, observation by scanning an electron microscope (SEM) at magnification of 10,000 times equivalence is performed on the surface of a cellulose fiber (solid state) or a nonwoven fabric at three points at random as mentioned above. Lines are drawn in the obtained SEM images (for example, FIG. 1 or FIG. 2) in the horizontal and vertical directions to the image (for example, white lines in FIG. 1) and fiber diameters of fibers intersecting on the line were actually measured from expanded images and the number of intersecting fibers and a fiber diameter of each fiber are counted. A number average fiber diameter is calculated in this way using the two series of results of the horizontal and vertical measurement for one image. Number average fiber diameters are also calculated for further extracted two other SEM images in the same way and the result for three images in total are averaged, which is assumed as the number average fiber diameter for the object sample. The number average fiber diameter of a sample shown in FIG. 1 was 67 nm while the number average fiber diameter of a sample shown in FIG. 2 was 111 nm, and both of the nonwoven fabrics fell under the cellulose nonwoven fabric of the present invention.

The cellulose fiber of the present invention is a cellulose fiber having a crystallinity determined by solid state NMR techniques is 60% or more, but if the crystallinity is preferably 65% or more and more preferably 70% or more, more excellent performances in heat resistance and low linear expansion coefficient can be expected. The solid state NMR techniques mean a method to calculate a crystallinity from a peak intensity ratio of a spectrum obtained by a solid high resolution NMR (CP/MAS method) for 13C nuclei.

More specifically, the crystallinity is defined as in the following formula (4) by an intensity ratio of two kinds of peaks (groups) attributable to C4 position of a cellulose molecular skeleton appearing in the vicinity of 80 ppm to 90 ppm in a spectrum (carbon peak of glycine is set to 176 ppm as a standard substance).

$$\text{Crystallinity} = \text{Intensity of Peak 1}/((\text{Intensity of Peak 1}) + (\text{Intensity of Peak 2})) \qquad (4)$$

Here, Peak 1 means a peak having the center at 89 ppm in the spectrum, and can be attributed to C4 carbon participating in the hydrogen bond of C4-O3-H . . . O5' present in crystalline regions at high density as described in a document ("Cellulose-Structural and Functional Aspects", ed. by J. F. Kennedy, G. O. Philips and P. A. Williams, John Wiley & Sons, pp. 87-92, 1989). Peak 2 means a peak having the center at 84 ppm, and it is attributed to C4 carbon not participating in the hydrogen bond mentioned above, and it is mainly present in amorphous regions.

Figure 3:
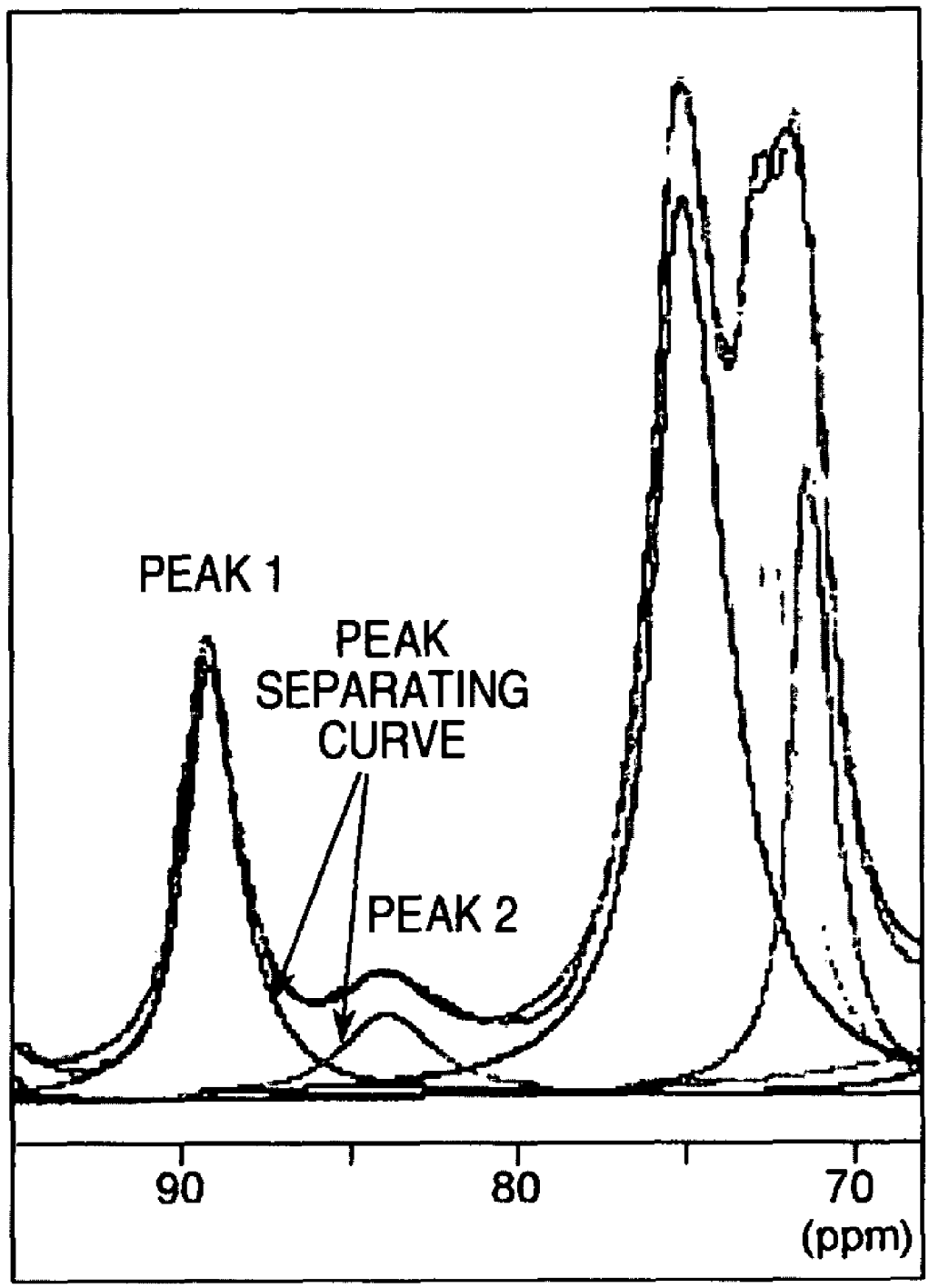
FIG. 3 is a schematic view illustrating how the crystallinity is determined from the intensity ratio of C4 carbon peaks in 13C-NMR spectrum of cellulose by solid state NMR techniques.

The NMR spectrum can be measured, for example, using a high resolution NMR spectrometer (MSL-400) manufactured by BRUKER Co. with a 7 mmϕ sample tube for exclusive use under spin rate: 3,000 Hz, observation frequency: 100.6 MHz, pulse width: 6.2 is, pulse delay: 5 s, contact time: 1 ms, number of accumulation: 1,500 times or more and at room temperature. The peak intensity ratio can be performed by a peak separation method. A spectrum of sheet shaped article of the present invention and an example of peak intensity analysis are shown and in FIG. 3.

As raw materials of the cellulose fiber of the present invention, any of natural cellulose such as refined pulp derived from wood (conifer and broadleaf trees), cellulose derived from cotton such as cotton linters or cotton lint, cellulose derived from seaweed such as *valonia* or Cladophorales, cellulose contained in sea squirts, cellulose produced by bacteria, finely pulverized fibers thereof and finely pulverized fibers of regenerated cellulose fibers can be used. Those having higher crystallinity are preferable from the viewpoint of low linear expansion coefficient and high mechanical strength, and fibers derived from natural cellulose are particularly preferable in this point. Particularly when regenerated cellulose fibers are used as raw materials, it is necessary to use fibers controlled to have high crystallinity defined by the present invention.

Among these, so-called bacterial cellulose (BC) which microbes such as acetic acid bacteria belonging to genus *Acetobacter* and CJF002 bacteria of genus *Enterobacter* is available as a water dispersion (gel in some cases) of never dried product comprising fine fibers having a fiber diameter of 100 nm or less, and therefore, a dispersion to be used for paper making and coating can be prepared in a relatively mild dispersion condition and thus it is technically advantageous.

Specific examples of BC include cellulose produced by culturing acetic acid bacteria (genus *Acetobacter*) such as *Acetobacter xylinum* subsp. *sucrofermentans, Acetobacter xylinum* ATCC23768, *Acetobacter xylinum* ATCC23769, *Acetobacter pasteurianus* ATCC10245, *Acetobacter xylinum* ATCC14851, *Acetobacter xylinum* ATCC11142 and *Acetobacter xylinum* ATCC10821, strains belonging to genus *Agrobacterium*, genus *Rhizobium*, genus *Sarcina*, genus *Pseudomonas*, genus *Achromobacter*, genus *Alcaligenes*, genus *Aerobacter*, genus *Azotobacter* and genus *Zoogloea* and besides genus *Enterobacter* or genus *Klyuvera* such as CJF002 as well as various mutants created by subjecting them to mutagenesis by conventional methods such as those using NTG (nitrosoguanidine).

In contrast, although cellulose materials for general purposes such as refined wood cellulose pulp, refined cotton linters and refined cotton lint originally consist of fine fibers called as microfibrils of 100 nm or less, they are present in dry condition in nature and become bunches at a drying step so that they exist as thicker fibers (it is the same for the regenerated cellulose fibers). In order to use these cellulose materials for general purposes in the present invention, it is necessary to create the state that there are contained no fibers having a fiber diameter of 1,500 nm or more at all by performing a finely pulverizing treatment repeatedly using a device which has a performance to separate bunched fibers apart such as a high pressure homogenizer or a super-high pressure homogenizer. Above all, fibers obtained by finely pulverizing cellulose derived from cotton (finely pulverized cellulose derived from cotton) are particularly effective because they are economically advantageous and can be prepared from materials for general purposes having high cellulose purity (for example, cotton linters) and that they are highly crystalline.

The fine cellulose fiber of the present invention has not only a high crystallinity but also a high purity and therefore it can effectively make use of characteristics of highly crystalline cellulose excellent in heat resistance, in particular. Specifically, from the viewpoint of heat resistance, it is preferable that a concentration of nitrogen contained in the cellulose fibers is 0.4% by weight or less and a concentration of total organic carbon isolated in water (TOC) measured in a contact water in 24 hours after 10 g of the fiber is immersed in 100 g of water at 4° C. is 60 ppm or less.

Here, the nitrogen content and the TOC are indices of the contents of compounds derived from protein (which contributes to the increase in the nitrogen content) and impurities by water-soluble polysaccharides (which contributes to the increase in the TOC) respectively which tend to cause contamination in a generation process of the fine cellulose fibers of the present invention. More specifically, they mean protein derived from organisms such as various microbes (bacteria) which are used in main production processes of the fine cellulose fibers of the present invention or water-soluble polysaccharides which can be generated as a by-product in a process of biosynthesis of cellulose.

The measurement of the nitrogen content in the fine cellulose fiber of the present invention can be performed by element analysis, for example, Kjeldahl method ("Bunseki-Kagaku Jikken Handbook" ("Handbook for Analytical Chemistry Experiments") ed. by the Japan Society for Analytical Chemistry, Maruzen, 1987, p.601) which is suitable for the detection of a very small amount of nitrogen elements. The lower the nitrogen content in the fine cellulose fibers is, the more preferable, but when it is more preferably 0.2% by weight or less, most preferably 0.1% by weight or less, the heat-resistant degree described later improves more.

An evaluation method of TOC can be performed as follows. After fibers in the solid state, a fiber dispersion or a nonwoven fabric is mixed with water so that it reaches the predetermined fiber concentration, fibers are once dispersed to be separated by a dispersing machine having a high dispersing power such as a blender and allowed to stand still at 4° C. for 24 hours. Then the water phase ingredient (contact water) is separated and collected with an extractor-type centrifuge and TOC is evaluated. An ultrapure water having extremely low impurities concentration is used in a series of operation of a sample preparation for TOC evaluation. The measurement of TOC is based on the technique of two channel method ("Kogai-Boshi no Gijutsu to Hoki, Suishitsu-hen" ("Technology and Law of pollution prevention, water quality"), 5th revision, supervised by Ministry of International Trade and Industry, Environmental Protection and Industrial Location Bureau, Maruzen, 1995, p.409) in which an amount of total carbon detected (TC) and an amount of inorganic carbon detected (IC) are measured respectively by a non-dispersive type infrared gas analyzer, and the difference is assumed as TOC.

For example, water-soluble polysaccharides tend to be produced as a subsidiary product in a microbial cellulose culturing system as is described in the specification of JP-A-2004-208563. The present inventors have found that such polysaccharides have low heat resistance compared with cellulose and that the less the polysaccharides are contained, the more profitable to heat resistance of cellulose fiber and cellulose shaped article.

For example, when CJF002 bacteria mentioned above is cultured, polysaccharides mainly consisting of four sugar units of D-glucuronic acid, D-galactose, D-glucose and L-fucose are produced as is described in the specification of above-mentioned JP-A-2004-208563. Since the molecular skeleton has a chemical structure similar to cellulose which is a polymer of glucose and, it is considered that it is hard to remove such polysaccharides due to the interaction through hydrogen bond and the like, but fine cellulose fibers which satisfy the condition mentioned above are enabled to be produced by carrying out a careful purification process. From a viewpoint of enhancing heat resistance by removing organic compound components having lower heat resistance than water-soluble polysaccharide and cellulose, TOC in the cellulose fibers of the present invention is preferably 60 ppm or less, more preferably 40 ppm or less, most preferably 25 ppm or less. As for the fine cellulose fibers of the present invention, it is preferable that they have a high cellulose purity as mentioned above and for the purpose of achieving this condition, lignin and hemicellulose and various proteins are removed at a high level in a purification step when natural cellulose other than BC is used as raw materials. The purification step can be performed by following common purification methods of natural cellulose such as cooking in an alkaline aqueous solution, fat removing treatment, bleaching treatment, (for example, refer to "Cellulose no Kagaku" ("Science of Cellulose"), ed. by Akira Isogai, Asakura Shoten, pp. 20-26, 2003) and the purification method and the degree thereof can be selected appropriately in order to satisfy the conditions prescribed by the present invention.

In addition, in the case of purification of BC, products other than cellulose fibers produced by culturing are preferably washed and purified. For example, when the cellulose fibers of the present invention by the culturing method using acetic acid bacteria system or CJF bacteria of genus *Enterobacter* mentioned above, in order to remove bacteria remaining after culturing as much as possible, it is preferable, for example, to disperse the lump of cellulose in water-containing state which contains bacteria obtained by dehydrating the culturing liquid into an alkali aqueous solution in which the concentration of sodium hydroxide, potassium hydroxide or the like is 0.1% by weight to 15% by weight, and performing washing to perform higher decontamination of bacteria. In this case, for example, the lysis of bacteria effectively proceeds by performing a heat treatment for several minutes to several hours at a temperature of 80° C. to 160° C. in an autoclave device and the like and dissolution of bacteria to an alkali aqueous solution phase and the removal of bacteria at a washing step become easy, which is thus preferable. Furthermore, a bleaching treatment with chorine bleaches such as sodium hypochlorite or hydrogen peroxide, a protease treatment such as lysozyme, a surfactant treatment such as a treatment with sodium lauryl sulfate or deoxycholic acid are also effective.

The purification step can be performed by dehydrating a dispersion of cellulose fiber or fine cellulose fiber (in the case of BC) or gel (in the case of BC static culture) containing impurities and then washing with water and dehydration repeatedly. It is preferable to design the step so that the solid content density rises as much as possible in each dehydration (compression) steps to raise efficiency of washing, and thus it is convenient because impurities can be efficiently drained out of the system by this in each step.

For this purpose, for example, it is particularly effective to use dehydrator such as a screw press dehydrator manufactured by FUKOKU KOGYO CO., LTD., but it is not limited to this. In addition, in the purification of BC fiber obtained by spinner culture in particular, it is good, for example, to perform dispersing treatment as high as possible such as dispersion with a homomixer in redispersion to water after dehydration, and it is effective to efficiently remove impurities stuck to the surface of fine cellulose fibers.

Furthermore, it is preferable in the cellulose fibers and cellulose nonwoven fabrics of the present invention that the concentration of contained chlorine, which serves as one index of the amount of chlorine bleach used at the purification step and the amount of contained metal ions which contaminate the solid in the purification and sheet forming steps is 40 ppm or less. This is because if the concentration of contained chlorine is 40 ppm or less, chlorine containing impurities and metal ions such as Na, Ca which can affect the heat resistance of cellulose fibers or cellulose nonwoven fabrics of the present invention may be contained at relatively low concentration. When the chlorine ion content is more preferably 30 ppm or less, further preferably 25 ppm or less, heat resistance will be more suitably exhibited. The evaluation of chloride ion concentration can be performed, for example, by ion chromatography method.

The highly pure fine cellulose fibers and cellulose nonwoven fabrics described above are advantageous in the aspect of heat resistance. The "heat resistance" can be measured as follows.

In the cellulose nonwoven fabric of the present invention, a difference $\Delta b^*$ in color parameter $b^*$ of the nonwoven fabric after and before heat treatment, where the nonwoven fabric is kept at 180° C. for 72 hours in the air, is defined by the following formula, $$\Delta b^* = (b^* \text{ after heat-treatment}) - (b^* \text{ before heat-treatment}) \quad (4)$$

preferably 6.0 or less, more preferably 3.0 or less. If $\Delta b$ is in the above range, the cellulose nonwoven fabrics have characteristics that they cause little change in color degree under a high temperature heating environment. Here, color parameter $b^*$ is one of the coordinate axes in $L^*a^*b^*$ in the chromaticity diagram in the color coordinate system formulated by JIS Z 8730 (color difference indication method) and the positive direction of $b^*$ means that yellow chroma increases. In other words, small $\Delta b^*$ under heating environment means that degree of heat deterioration symbolized by yellowing is small. The estimation of $b^*$ can be performed using Macbeth spectral photometer Color-Eye 3000 model (normal color control system ver. 5.1) manufactured by Sakata Inx ENG. CO., Ltd., with C source of light and view angle of 2°. Even in the estimation of a thin sheet shaped article, estimation can be performed only by setting the sheet in a sample holder of the above device without conducting operation such as lining the sheet shaped article with a standard white board.

Next, the present invention is directed to a cellulose nonwoven fabric wherein the sheet has a porosity of not less than 40% and not more than 99% and comprises fine cellulose fiber having the characteristics mentioned above. Here, the cellulose nonwoven fabric in the present invention means either a nonwoven fabric (paper) obtained by drying a gelatinous film obtained by static culture of bacteria, or a nonwoven fabric obtained by preparing a dispersion containing cellulose in which fine cellulose fibers such as BC are highly dispersed, forming a sheet therefrom by either of the paper making method or coating method and then drying the sheet.

In addition, the porosity Pr (%) of a cellulose nonwoven fabric is a value calculated from the sheet thickness d (µm) and the weight W (g) of a 10 cm square using the following formula:

$$Pr = (d - W \times 67.14) \times 100/d \quad (6)$$

The porosity of cellulose nonwoven fabrics is preferably 40% or more from the viewpoint of, for example, penetration when they are used as a filter or a separator, impregnation of a resin solution and the like to cellulose nonwoven fabrics when a composite with a resin is produced, transparency of an obtained composite and shaping workability, and it is preferably 99% or less from the viewpoint of linear expansion coefficient, strength, heat resistance when they are used as a composite. More preferably, the porosity is 42% or more and 98% or less, and most preferably the porosity is 45% or more and 95% or less.

The sheet thickness of the nonwoven fabrics is not limited in particular but it is preferably 5 µm or more and 500 µm or less, more preferably 10 µm or more and 300 µm or less and most preferably 15 µm or more and 200 µm or less. It is preferable that the sheet thickness is 5 µm or more from the viewpoint of strength of a nonwoven fabric. In addition, nonwoven fabrics having a sheet thickness of 500 µm or less do not need an excessive time when, for example, impregnated with a resin solution and the like in making a composite with a resin and can perform the filtration step of paper making for a relatively short time. Therefore, such fabrics are suitable from a viewpoint of being able to achieve high industrial production. The sheet forming processes by paper making process or coating process from a dispersion of BC or fine cellulose fibers are more preferable than sheet forming from static culture of BC, particularly from a viewpoint of industrial production of nonwoven fabrics for the reason that a sheet with a wide area and excellent quality stability can be obtained. In the case of static culture method by bacteria, it is desirable to produce as a nonwoven fabric having a high porosity by appropriately selecting among dry methods described later from a viewpoint of increasing impregnating ability at the time of hybridization with a resin.

It is also preferable that the fiber diameter of fibers constituting a cellulose nonwoven fabric of the present invention is small. If the maximum fiber diameter is 1,500 nm or less, a nonwoven fabric is composed of fine networks and thus preferable since the fabric has higher performance as a highly functional filter and a separator of electric storage device (high fine particle trapping performance and anti-short resistance).

Furthermore, when the number average fiber diameter of the fibers is 200 nm or less, more preferably 160 nm or less, and most preferably 120 nm or less, the function of the nonwoven fabric of the present invention is suitably developed. The number average fiber diameter and the maximum fiber diameter of fibers constituting a cellulose nonwoven fabric are defined following the definition by the SEM method described above.

The cellulose nonwoven fabrics of the present invention comprise fine cellulose fibers described above, but they may further comprise fibers other than cellulose (thermoplastic resin fiber, glass fiber, carbon fiber, metal fiber, natural fiber, organic fiber) as long as the present invention is not deteriorated. It is preferable, however, that all the fibers constituting the nonwoven fabric satisfy the condition of the number average fiber diameter mentioned above (200 nm or less) in consideration of the development of the function (for example, transparency and low linear expansion coefficient) in case of hybridization of the nonwoven fabric of the present invention with a resin.

Examples of such fine fibers include aromatic polyester fibers polyethylene terephthalate, aromatic polyamide fibers such as Kevlar, aromatic polyimide fibers, aliphatic polyamide fibers, aliphatic polyester fibers, polyketone fibers, polyacrylonitrile fibers, polyvinylidene chloride fibers, polyvinyl chloride fibers, polyvinylidene fluoride fibers, polyvinyl fluoride fibers, polyacetal fiber, polylactate fiber, cellulose derivatives such as cellulose acetate but they are not limited to these. As for those fibers other than the cellulose having a number average fiber diameter of 200 nm or less, those prepared by subjecting highly orientated fibers having a thickness of several μm or more obtained by normal spinning methods (wet spinning, dry spinning, melt spinning) to fibrillation or fine pulverization to an extremity level by physical techniques 1) to 3) described later or those manufactured by nanofiber preparing method such as electrospinning method are used.

Next, as for the cellulose nonwoven fabric of the present invention, the average transmittance $T_{r,av}$ defined by the following formula (1) which is determined by scanning a light with a wavelength of 850 nm perpendicularly to the nonwoven fabric immersed in toluene is preferably 0.70 or more, more preferably 0.75 or more and most preferably 0.80 or more. If it is in this range, finely porous structure is secured as a nonwoven fabric and at the same time, materials having a high transparency when hybridized with a resin can be suitably obtained. This is caused by the following reasons.

When a nonwoven fabric containing cellulose which has a refraction index a little different from toluene whose refraction index is 1.496 at 20° C. (according to "Polymer Handbook 3rd Edition" Ed. by J. Brandrup and E. H. Immergut, John Wiley & Sons, New York, 1989, ppV126, refraction index of cellulose is in the range of 1.51 to 1.62 depending on the kind of cellulose and orientation of a sample) is immersed in toluene, if the fibers constituting the nonwoven fabric comprise a number of fibers whose fiber diameter is not small enough as compared with the visible wavelength around 400 nm, scattering at the interface works as an inhibitor factor of light transmission of the nonwoven sheet, and therefore, the value of average transmittance under the above conditions is a physical property value which reflects fineness of the fibers constituting the nonwoven fabric or fineness of the network structure of the nonwoven fabric. When the space in the nonwoven fabric containing cellulose is filled with a resin to perform hybridization, the average transmittance $T_{r,av}$ obtained in the above condition naturally correlates to transparency of the obtained composite.

Here, the measurement of $T_{r,av}$ is performed with Turbiscan™ MA-2000 (manufactured by ECO INSTRUMENTS Co., Ltd.) in the present invention. This is a device which was originally developed to evaluate temporal stability of a solution or dispersion, but the inventors have found that it is extremely sensitive to the information of a fiber diameter which constitutes a nonwoven fabric and the information of fineness of the network structure in the nonwoven fabric when the measurement described later is carried out by immersing a nonwoven fabric intended for by the present invention in toluene and that it is extremely effective for the purpose of making discrimination between the samples.

Figure 4:
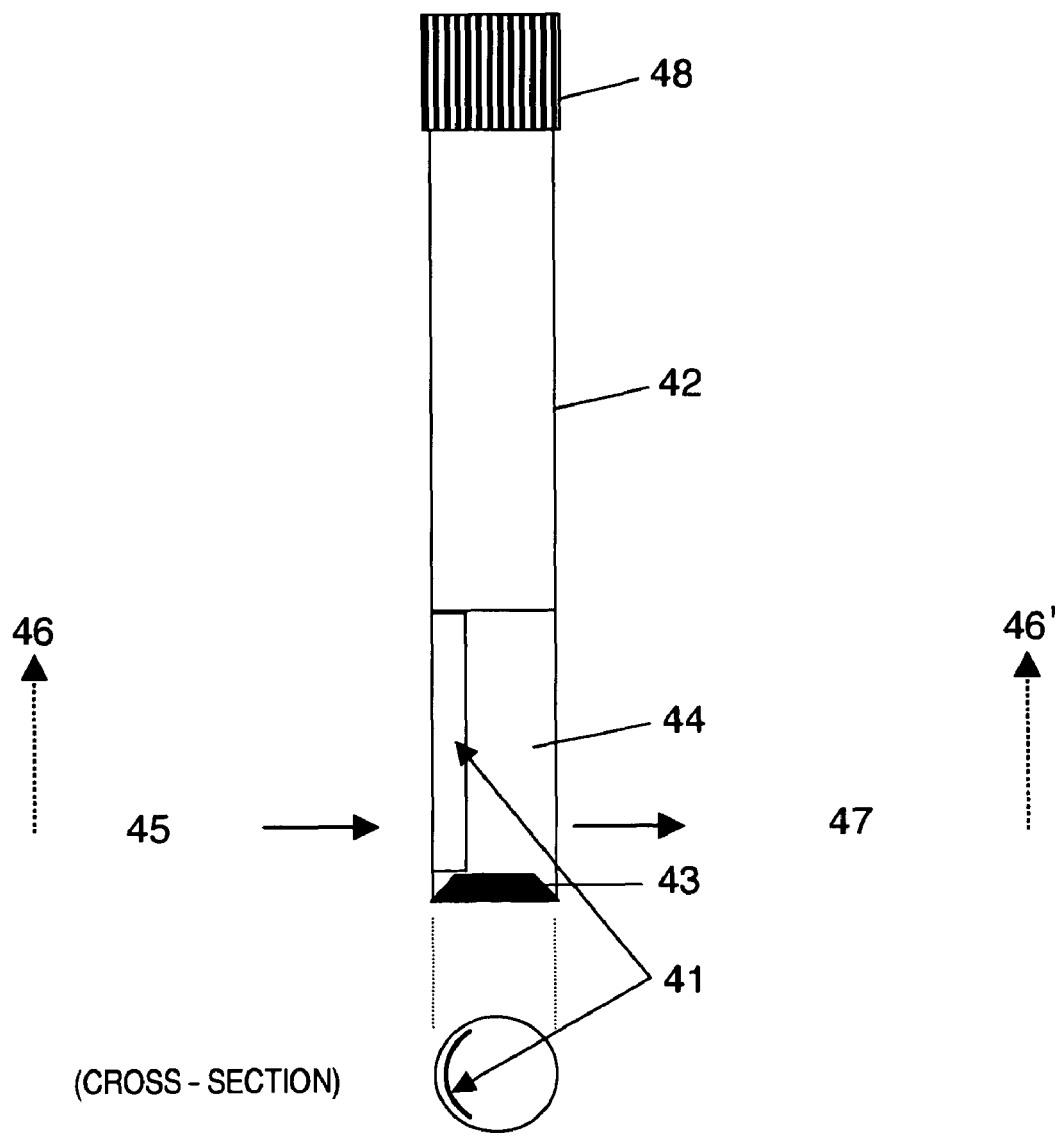
FIG. 4 is a schematic view illustrating the measurement of average transmittance $T_{r,a}$ of a nonwoven fabric immersed in toluene.

The measurement of $T_{r,av}$ of a nonwoven fabric is performed as follows as shown in FIG. 4. First, a nonwoven fabric sample 41 to be measured is cut out in a rectangle of 10 mm×50 mm, put in a sample tube filled with toluene so as to be immersed therein, and subjected to vacuum defoaming treatment for the purpose of removing foams inside the nonwoven fabric. Next, the nonwoven fabric sample 41 impregnated with toluene is closely adhered to the inside wall of a glass test tube 42 which is attached to the device at such a position as the sample contacts the bottom lid 43 of the test tube while the major axis of nonwoven fabric sample 41 is kept in the lengthwise direction of the test tube 42, and then toluene 44 is carefully injected to the inside wall of the test tube 42 so that the height of toluene may be 5 cm and the upper lid 48 is attached. At this time, it is installed in such a configuration that laser light perpendicularly hits the nonwoven fabric sample approximately at the center thereof and that the laser light 45 hits the nonwoven fabric from the wall surface of the proximal side.

Figure 5:
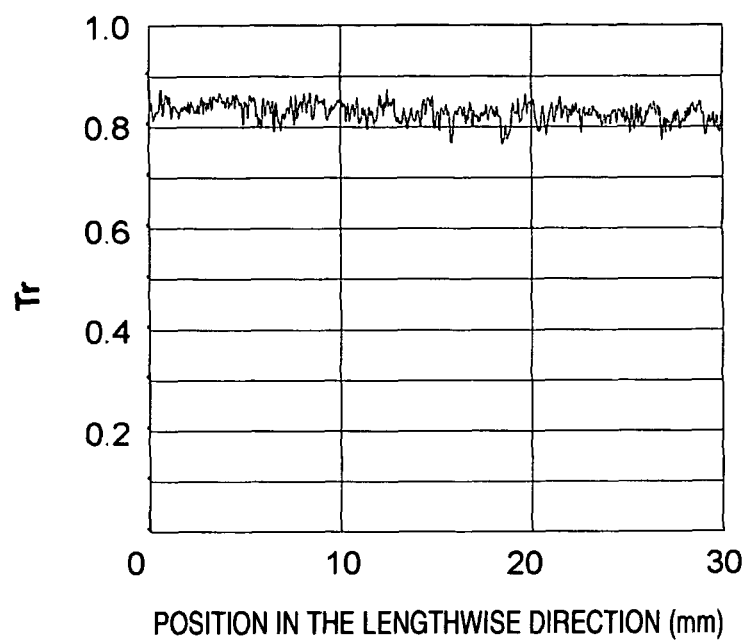
FIG. 5 is a profile of transmittance Tr (horizontal axis; lengthwise direction) of a nonwoven fabric immersed in toluene.

Next, a laser light of 850 nm is scanned in the lengthwise direction of the test tube following the normal method of using the device. A detector section thereof also moves to the same direction 46' as the scanning direction 46 of the source of light, and the device detects transmitted light 47 at every 40 μm in the range of 60 mm in total in the normal method. The transmittance $T_r$ is measured in the lengthwise direction of the test tube following the standard measuring method of the device in the present invention. This profile is checked and the center portion of 30 mm which is considered to cover the nonwoven fabric is cut out (or assumed to be the target) and the average $T_{r,1}$ of transmittance $T_r$ of 750 points in total is calculated (FIG. 5).

Next, a similar measurement is performed in the condition that only toluene is injected to the same test tube as used in the above measurement to the height of 5 cm (without setting a nonwoven fabric) and the average $T_{r,2}$ of transmittance $T_r$ also of 750 points in total is calculated. The transmittance $T_{r,av}$ of the nonwoven fabric impregnated with toluene was obtained using the thus obtained $T_{r,1}$ and $T_{r,2}$ by formula (1).

$$T_{r,av}=T_{r,1}/T_{r,2} \tag{1}$$

When the standard deviation of measurement of $T_r$ in the presence of a nonwoven fabric is designated as $T_{r,sd1}$ and the standard deviation of measurement of $T_r$ only with toluene is designated as $T_{r,sd2}$ in the measurement described above, the standard deviation $T_{r,sd}$ of distribution of the transmittances of the nonwoven sheet impregnated with toluene is defined by $$T_{r,sd}=T_{r,sd1}-T_{r,sd2}$$

and used as a measure of uniformity of the sheet impregnated with toluene, and the sheet uniformity parameter H is defined as follows:

$$H=T_{r,sd}/T_{r,av} \tag{2}$$

H defined by formula (2) significantly influences the optical uniformity of a composite particularly when the composite is made from the cellulose nonwoven fabric of the present invention and a resin and used as optical film and the like. If the value H is 0.018 or less, the sheet is not only excellent in uniformity of the sheet itself but also can be an excellent nonwoven fabric as a base material of the composite and therefore preferable. If the value H is more preferably 0.012 or less, most preferably 0.008 or less, nonwoven fabric of the present invention extremely excellent as a base material of a composite can be provided. From the viewpoint of unevenness of existence density of cellulose part by part of the nonwoven fabric, it is preferable to use a nonwoven fabric having a value H of 0.018 or less. If there is unevenness of existence density of cellulose, the position of low density becomes a structural defect, and as a result, deterioration in the strength of the nonwoven fabric as a whole may be caused.

In the present invention, it is preferable that the value of unevenness parameter H' defined in the following formula (3) is 0.2 or less from the viewpoint of uniformity of a sheet which means that a certain physical properties can be expected by using any part of the product. If the value of H' is more preferably 0.15 or less and most preferably 0.10 or less, nonwoven fabrics excellent in uniformity and stable in physical properties can be provided.

In the present invention, Turbiscan™ MA-2000 (manufactured by ECO INSTRUMENTS Co., Ltd.) is used in the measurement of H' similarly as in the measurement of uniformity parameter H described above. However, the measurement of H' of a nonwoven fabric is performed as follows for a nonwoven fabric in dry state.

First, a nonwoven fabric sample to be measured is cut out in a rectangle of 10 mm×50 mm and placed in a sample glass tube which is attached to the device at such a position as the sample contacts the bottom lid of the test tube while the major axis of nonwoven fabric sample is kept straight (and tight) in the lengthwise direction of the test tube. At this time, it is installed in such a configuration that laser light perpendicularly hits the nonwoven fabric sample approximately at the center thereof (See FIG. 4). Next, laser light having a wavelength of 850 nm is scanned in the lengthwise direction of the test tube following the normal method of using the device. The device measure transmittance Tr at every 40 μm in the range of 60 mm in total in the normal method and this profile is checked and the portion of 30 mm which is considered to cover the nonwoven fabric is cut out (or assumed to be the target) and the unevenness parameter H' defined by the following formula (3) is calculated.

$$H' = T'r,sd / T'r,av \quad (3)$$

Here, T'r,av and T'r,sd respectively mean the average and standard deviation of all Tr values obtained by irradiating a light with a wavelength of 850 nm perpendicular to a dried sheet surface, and measuring Tr for each 40-μm length in the linear direction along the sheet surface to the total length of 3,000 μm (number of data: 750 points).

Because T'r,av is an average value of the transmittances, it will decrease as the sheet thickness increases. Since T'r,av is a denominator in the formula representing H' in the formula (3), the requirement that H' is in the range prescribed by the present invention means that the upper limit of the sheet thickness is also limited. The upper limit of the sheet thickness of a nonwoven fabric satisfying such a condition is usually about 60 μm.

This measurement detects distribution (resolving power: 40 μm) of transmittance of the light along the sheet surface mainly attributable to the distribution of the sheet thickness of a nonwoven fabric and enables to qualify the degree of variation by using this parameter as an index of uniformity.

Furthermore, it is preferable in particular in the present invention that air permeability of a cellulose nonwoven fabric is not less than 5 s/100 ml and not more than 900 s/100 ml, sheet thickness is not less than 5 μm and not more than 100 μm and porosity range is not less than 70% and not more than 99%, which results in extremely excellent impregnating ability of solvents, polymer solutions and monomers at the time of hybridization. More preferably, when the air permeability is not less than 10 s/100 ml and not more than 800 s/100 ml, sheet thickness is not less than 5 μm and not more than 80 μm and porosity range is not less than 75% and not more than 95%, nonwoven fabrics of the present invention excellent in a balance of mechanical strength/air permeability/solvent impregnating ability/through-hole diameter can be provided.

The measurement of air permeability of a nonwoven fabric is performed by measuring the permeation time of 100 ml of air (unit: s/100 ml) at room temperature using a gurley type densometer (manufactured by Toyo Seiki Co., Ltd., model G-B2C). One nonwoven fabric sample is measured at five variously different points and the average thereof was assumed as air permeability. Such a nonwoven fabric can be obtained by making a wet web by paper making process from an aqueous dispersion, then substituting with an organic solvent and drying, but the manufacturing process is not limited in particular. Such a nonwoven fabric is excellent as a separator or a functional filter, or a matrix of a composite film with resin, in particular.

Next, it is preferable in particular that air permeability of the nonwoven fabric of the present invention is not less than 1000/100 ml, sheet thickness is not less than 5 μm and not more than 100 μm and porosity range is not less than 40% and not more than 65%, which results in high mechanical strength and low linear expansion coefficient. The nonwoven fabric in these property ranges can be obtained, for example, by making a wet web in the paper making process from an aqueous dispersion followed by drying thereof, or by forming a sheet from an aqueous dispersion in the coating process, as described later, but the production process is not limited to these in particular.

Next, production process of cellulose fibers of the present invention or a nonwoven fabric comprising the fibers is described.

Selection of cellulose fiber raw materials to produce cellulose fiber of the present invention and the purification method are as described above, but it is necessary in the present invention to subject the fiber raw materials to finely pulverizing (downsizing) treatment so that they have a range of diameter under the maximum fiber of the present invention.

When BC (correctly BC/water dispersion) was used as cellulose fiber raw materials, BC is usually extracted as a water dispersion in which nanofibers are dispersed without making bunches and therefore can be used without subjecting them to finely pulverizing treatment. Cellulose raw materials other than BC often consist of nanofibers as unit of fibers originally produced in living organisms but they usually dry and tend to be bunches and are present as fibers whose fiber diameter is several μm or more, and therefore it is necessary to perform downsizing treatment so that they fall under the range of the fiber diameter described above.

Effective ones of such downsizing treatments include three types of downsizing machine:

1) So-called high pressure homogenizer such as NS type high pressure homogenizer of Niro Soavi Corp. (Italy), Rainier type (R model) pressure homogenizer of SMT Co., Ltd. and high pressure type homogenizer of Sanwa Machine Co., Ltd., 2) So-called superpressure homogenizer using high pressure collisions type downsizing mechanism such as Microfluidizer of Mizuho Industrial Co., Ltd., Nanomizer of Yoshida Machine Kogyo Co., Ltd. and Ultimizer of Sugino Machine Co., Ltd., and 3) So-called grinder type downsizing machines such as PureFine Mill of Kurita Machinery Mfg. Co., Ltd. and millstone type grinders represented by Super Mascolloider of Masuyuki industry Co., Ltd. or any combination of these. In any case, the cellulose fiber raw materials are preferably treated in a wet process system in which they are dispersed.

The solid content ratio of fiber raw materials at the time of downsizing treatment is preferably 0.1% by weight or more and 10% by weight or less from the viewpoint of viscosity of the treated dispersion and easiness of liquid transportation. More preferably it is 0.3% by weight or more and 6% by weight or less, most preferably it is 0.5% by weight or more and 4% by weight or less, since the frequency of blocking can be reduced in this range. Furthermore, particularly when the device of 1) or 2) is used, it is preferable to preliminarily homogenize a dispersion to pass the dispersion through the device stably and for this purpose, treatments by beater, disc refiner and grinder processing of 3) is effective, but means of downsizing is not limited to these.

Next, downsizing conditions using the downsizing devices of above 1) to 3) are described.

High downsizing conditions are set so as to prepare fine fibers comparable to the cellulose fibers of the present invention using any of the devices.

As for above 1) and 2) in particular, degree of downsizing is decided by processing pressure and the number of pass times.

When a high pressure homogenizer of above 1) is used under a pressure of preferably 70 MPa or more, more preferably 85 MPa or more, or most preferably 100 MPa or more, the cellulose fibers can be suitably produced in the fiber diameter range of the present invention. Here, the number of pass times of treatment to prepare the fibers is preferably 5 passes or more, more preferably 8 passes or more, and most preferably 12 passes or more.

When a superhigh pressure homogenizer of above 2) is used under a pressure of preferably 100 MPa or more, more preferably 120 MPa or more, or most preferably 150 MPa or more, the cellulose fibers can be suitably produced in the fiber diameter range of the present invention. Here, the number of pass times of treatment to prepare the fibers is preferably 3 passes or more, more preferably 5 passes or more, and most preferably 8 passes or more.

Next, when a grinder type downsizing machine of above 3) is used, two pieces of grinders corresponding to a stonemill is selected to be a suitable type (for example, in the case of Masucolloider, an MKG type disk is preferable) and at the same time, they are preferably set so as to make the clearance (distance between disks) as small as possible (specifically, 0.1 mm or less), rotation rate as high as possible (8000 rpm or more) and the number of pass times is preferably 5 passes or more, more preferably 10 passes or more, and most preferably 15 passes or more. However, the above-mentioned conditions can be applied to the case where downsizing is performed using only one of the devices and milder conditions may be enough to exhibit effects in the cases when it is carried out in combination.

Furthermore, the present inventors have found that the cellulose fibers of the present invention can be preferably produced in the above downsizing treatment step by subjecting the fiber raw materials preliminarily immersed in water or an aqueous solution to a high-temperature treatment at 100° C. or more for one hour or more in a pretreatment step before downsizing, followed by dispersing wet cellulose obtained by removing the water or aqueous solution in water again and further conducting a finely pulverizing treatment as mentioned above.

The downsizing of the cellulose fibers are usually carried out in a dispersion having a higher concentration than the cellulose concentration of the dispersion to be used for coating and paper making in consideration of efficiency of production. Then it is appropriately diluted to the concentration of the dispersion to be used for coating and paper making and used after dispersed. It is possible to store the dispersion of cellulose obtained after downsizing treatment by dehydrating, condensing to prepare a dispersion for coating or paper making till it is diluted when used. In the present invention, dispersions containing downsized cellulose fibers of the present invention and a dispersing medium and dispersions to be used for coating and paper making are generally referred to as "dispersions for coating and paper making".

The conditions of high-temperature treatment is preferably set to a more severe condition than 110° C. for 2 hours, more preferably 115° C. for 3 hours, which is more effective as pre-treatment for obtaining cellulose fibers of the present invention. Such a high-temperature treatment works extremely effectively from the viewpoint of removing impurities and obtaining highly pure cellulose insisted by the present invention.

When an aqueous solution is used as a medium of a high-temperature treatment, any compound which dissolves in water and sufficiently functions as pretreatment of the above purpose can be used. Examples of such compounds include bases such as sodium hydroxide and potassium hydroxide, ammonia and addition thereof in such a degree that does not cause hydrolysis can be effective. In addition, a neutral organic compound having affinity to cellulose such as glycerin, ethyleneglycol or glucose may penetrate among microfibrils (nanofibers) which are in the form of a bunch to favorably swell them. After high-temperature treatment mentioned above, water and the aqueous solution which are a medium of treatment are removed, more specifically removed by dehydration and washing and final dehydration were performed to obtain wet cellulose, and this is thinned and dispersed in water and subjected to downsizing treatment of the above 1) to 3) and the like, and it is preferable not to completely dry the wet cellulose at this time. The reason is because the microfibrils which has been once swollen by high-temperature treatment will make bunches again when dried and become a form which is hard to be downsized.

According to the present invention, a dispersion is prepared at first by dispersing the cellulose fiber obtained by the step described above in water or an organic solvent or a mixed solvent thereof, and then the dispersion is formed into a film by paper making method or coating method and thereby a nonwoven fabric containing cellulose of the present invention can be suitably produced. Here, it is extremely important to prepare a dispersion controlled to a suitable dispersion state since fine cellulose fibers as described above are used in the present invention.

Because the dispersant is dried to form a film after coating in the coating method, it is preferable to disperse cellulose fibers in a dispersion to be used as possible as high. For this purpose, use of the high pressure homogenizer, super-high pressure homogenizer or a grinder described above is extremely effective. These may be used in combination. Particularly when BC is used as cellulose fiber, a dispersion for suitable coating can be obtained by any of these three kinds of dispersing device or some of them in combination.

It is particularly preferable that the concentration of cellulose fibers in the dispersion is set rather high because the dispersion directly go into a drying step from the state of dispersion just applied in the coating method. Specifically, the concentration is preferably 0.3% by weight or more from the viewpoint of easiness of industrial production such as readiness of removing the dispersant, and 3.0% by weight or less from the viewpoint of operability such as viscosity of the dispersion. It is preferably selected from the range of 0.4% by weight or more and 2.5% by weight or less, more preferably 0.5% by weight or more and 2.0% by weight or less. Because the viscosity of a dispersion significantly changes depending on dispersant and presence of an additive, the concentration of cellulose fibers is set appropriately so that it has an appropriate viscosity in the coating step.

In addition, particularly in the case of the coating method, it is effective to use a hydrophobic organic solvent or a mixture of water and a hydrophobic organic solvent as a dispersant for coating for obtaining a nonwoven fabric having a high porosity of 60% or more. Example of these organic solvents include an alkyl alcohols having 1 to 4 carbon atoms such as methanol, ethanol, n-propyl alcohol, isopropyl alcohol, n-butyl alcohol, sec-butyl alcohol, tert-butyl alcohol, dimethylformamide, dimethylacetamide, ketones or keto alcohols such as acetone, diacetone alcohol, ethers such as tetrahydrofuran, dioxan, alkylene glycols with the alkylene group having 2 to 6 carbon atoms such as ethyleneglycol, propylene glycol, butylene glycol, triethylene glycol, 1,2,6-hexane triol, thiodiglycol, hexyethylene glycol, diethylene glycol, Cellosolves such as ethylene glycol monomethyl ether and ethylene glycol monoethyl ether, carbitols such as diethylene glycol monomethyl ether, diethylene glycol monoethyl ether, ethyleneglycol mono-n-butyl ether, diethylene glycol-n-butyl ether, triethylene glycol n-butyl ether, 1,2-alkyl diols such as 1,2-hexane diol and 1,2-octanediol and further polyethylene glycol, polypropylene glycol, glycerin and the derivatives thereof, N-methyl-2-pyrrolidone, 2-pyrrolidone, 1,3-dimethyl-2-imidazolidinone but they are not limited to these.

Next, the production process for sheet forming of cellulose nonwoven fabric of the present invention by paper making method is described.

It is preferable to prepare a dispersion for paper making of the cellulose fibers having a maximum fiber diameter of 1,500 nm or less so that the average dispersion diameter of cellulose fibers is 1 μm or more and 300 μm or less and the concentration of cellulose fibers is 0.01% by weight or more and 1.0% by weight or less.

The dispersion average diameter (hereinbelow designated as $R_v$) of cellulose fibers of the dispersion for paper making is preferably 1 μm or more from the viewpoint of water permeability and efficiency of paper making and 300 μm or less from the viewpoint of uniformity of the nonwoven fabric. The dispersion average diameter ($R_v$) as used herein means the arithmetic mean diameter of volume average measuring the dispersion for paper making at room temperature using a laser scattering particle size distribution measuring device (manufactured by Horiba, Ltd., laser diffraction/dispersion-type particle size distribution measuring apparatus LA-920, the lower detection limit of 0.02 μm). In addition, an arithmetic average diameter based on volume distribution is used in this measurement according to the scattering theory of Mie (M. Kerker, "The Scattering of Light", U.S.A. Academic Press, New York, N.Y., 1969, Cap. 5.) and as the relative refractive index of cellulose against water, 1.20 is used.

When $R_v$ of dispersion for paper making is preferably in the range of 3 μm or more and 200 μm or less, and more preferably 5 μm or more and 100 μm or less, nonwoven fabric of the present invention more excellent in uniformity can be provided.

The concentration of the cellulose fiber in the dispersion for paper making is preferably 0.01% by weight or more and 1.0% by weight or less, more preferably 0.05% by weight or more and 0.5% by weight or less and most preferably 0.1% by weight or more and 0.4% by weight or less. The cellulose concentration in dispersion is preferably 0.01% by weight or more from the viewpoint of securing the stability of the dispersion for paper making. If the concentration of cellulose is low, the cellulose fibers become a state where they are separate and so-called sedimentation occur under influence of gravity in the dispersion, and a nonwoven fabric (wet web) of wet condition is formed by mechanism close to that by paper making of common fibers. In other words, cellulose fibers having a high isolation degree forms the early stage of sedimentation layer at first and then this sedimentation layer becomes larger in sheet thickness to form a wet web by sedimentation of cellulose fibers sequentially. Because the sedimentation layer is an aggregate of fine fibers in this case, flow resistance is extremely large as compared with a sedimentation layer in paper making of common fibers. In other words, filtration resistance is so large and paper making takes time, and there can be influence on productivity. In addition, the cellulose concentration is preferably 1.0% by weight or less from the viewpoint of viscosity of the dispersion.

It is necessary to create a state that cellulose fibers are moderately associated in the dispersion without dispersing the cellulose fibers too much and not causing aggregation by the paper making method of the present invention performed by after casting the dispersion on the filter cloth installed on a metal wire and then separating the dispersing medium by filtration. This state is controlled by selection of dispersion machine, dispersion conditions and addition of mixed medium such as organic solvents or dispersing agents and the like to the dispersion.

Cellulose fibers of fine fiber diameters are used in the present invention, and dispersion machine effective for enhancing the dispersion state includes a dispersion machine rotating the blades having cutting function at a high speed such as a blender and high pressure homogenizer. Since fine cellulose fibers function to stabilize the dispersion of the cellulose fibers by themselves in such a dispersion, the higher the concentration is, the more stable dispersion can be obtained.

Next, a filter cloth capable of separating 95% or more by filtration under atmospheric pressure at 25° C. and having a water permeation of 0.005 ml/cm$^2$·s or more under atmospheric pressure at 25° C. is set as a filter cloth for paper making on the wire of a paper making machine and the above dispersion for paper making is filtered on the above filter cloth to deposit cellulose fibers on the filter cloth and thereby produce a wet nonwoven fabric containing 4% by weight or more, more preferably 8% by weight or more, still more preferably 10% by weight or more of solid contents. It is preferable that the upper limit of the solid content concentration of the wet paper of this case is 40% by weight from the viewpoint of controlling porosity in drying step. From the viewpoint of paper feeding of the process of consecutive sheet forming described later in particular, it is preferable that the wet web satisfies the range of the solid content. A wet web in the range of the solid content is prepared by suction treatment and press treatment. The cellulose nonwoven fabric of the present invention can be suitably obtained by peeling off the resulting wet web before or after drying step by letting a nonwoven fabric to separate from the filter cloth.

The filter cloth have ability of separating 95% or more by filtration under atmospheric pressure at 25° C. as mentioned here satisfies the following conditions. That is, the filter cloth to be tested is attached in wet condition on a cylinder form funnel having a rough mesh of pore size of 100 μm or more and an outer diameter of 100 to 125 μm or a glass filter in the form of a Buchner funnel (for example, Buechner funnel form glass filter manufactured by Shibata Science Co., Ltd., 25G) and a filtration test of a dispersion for paper making of the present invention is performed under atmospheric pressure. The filter cloth means a nonwoven fabric, a textile, a glass nonwoven fabric, a metal mesh and the like having a filtration ratio value calculated by:

((cellulose content contained in a dispersion for paper making used in the filtration test before filtrated)−(cellulose content contained in the filtrate))×100/(cellulose content contained in a dispersion for paper making used in the filtration test before filtrated) (%) of 95% or more, more preferably 98% or more wherein the cellulose fiber content contained in the filtrate is measured by drying method.

In addition, it is preferable that the filter cloth easily let water go through at the time of filtration test under the condition described above. That is, the amount of water permeation is preferably 0.005 ml/cm$^2$·s or more under atmospheric pressure at 25° C. More preferably, it is 0.015 ml/cm$^2$·s or more, by which condition the resistance when dispersant permeates through the filter cloth is extremely little and efficient paper making is achieved. When the amount of water permeation is 0.005 ml/cm$^2$·s or more, the filtration for paper making does not need to take a large length of time which is required by the water permeation resistance of the filter cloth and it is preferable from the viewpoint of productivity. This is important in particular in the case of consecutive paper making mentioned later. Furthermore, the upper limit of the amount of water permeation is practically 0.3 ml/cm$^2$·s from the condition about filtration rate of cellulose fibers. There is a case where the condition about water permeation of cellulose fibers described above is not satisfied for a filter cloth having a higher permeability than this.

Among filter cloths satisfying such a condition, it is preferable that the filter cloth used in the present invention is a nonwoven fabric or a textile which contains an organic polymer fiber or a porous sheet which contains an organic polymer. Because this selection is related to the easiness of peeling the cellulose nonwoven fabric from the filter cloth when it is peeled from the filter cloth after paper making, they contribute to the uniformity of sheet thickness distribution of the products. For example, when peeling the cellulose nonwoven fabric from the filter cloth after drying, the easiness of peeling is important.

As for the kind of the organic polymer, organic polymers other than cellulose which is the same as the cellulose fibers used in the present invention are preferable such as polyolefins such as polyethylene terephthalate, polyethylene and polypropylene, non-cellulosic general-purpose organic polymers represented by polyvinyl chloride, polyvinylidene chloride, polyvinylidene fluoride, 6,6-nylon and nylon-6 from the viewpoint of peeling properties mentioned later and non-swelling properties of the filter cloth in itself.

Pore diameter (through-hole diameter) of the filter cloth is an important element because performance demanded from the filter cloth used by the present invention is filterability (by cellulose fiber) and permeability (by dispersant). However, there are various shapes usable as a filter cloth, and a part of filter cloth materials swells under a dispersion medium environment mainly based on an aqueous system used in the present invention and therefore, the pore size measured under dry condition and substantial pore size are often different from each other. Since various materials can be permitted as well, suitable pore size cannot simply specified unconditionally.

Figure 6:
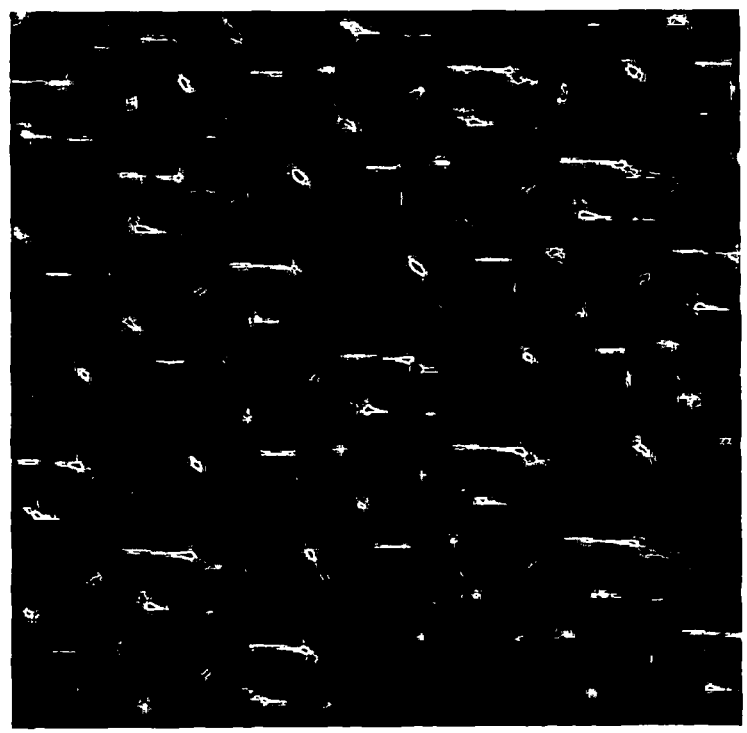
FIG. 6 is an optical microscope photograph of a textile made of polyethylene terephthalate usable as a filter cloth (460 mesh) in the present invention.

Examples of a filter cloth usable in the present invention include 460 mesh textile made of polyethylene terephthalate and having a pore size of about 20 μm×20 μm (FIG. 6). This filter cloth may have, for example, a filtration rate of approximately 100% for cellulose fibers if the conditions are satisfied, though a dispersion having $R_v$ smaller than 20 μm contains fibers smaller than 20 μm. This is considered that fibers of small particle size are absorbed in the paper making step by the aggregate of fibers, and increases the concentration by filtration while increasing the size. As a matter of course, the filter cloth is not limited to this. Unless the filter cloth satisfying this condition is used, there are cases where fine cellulose fibers pass through the filter cloth, resulting in a lower yield of the product or cases where production efficiency decreases since a nonwoven fabric needs a large length of time for filtration (paper making) due to poor water permeability.

Furthermore, for example, a cellulose nonwoven fabric used in the present invention can control porosity of the obtained nonwoven fabric by appropriately selecting a drying method for a wet web obtained by the above process. The drying method of the wet web obtained by the above process is not limited in particular and examples thereof include the following method.

When a wet web using water as a dispersant is just adhered on a metallic surface like a drum dryer and dried under a near condition of the constant length, cellulose nonwoven fabric having a porosity in the range of 40%-65% can be obtained. A nonwoven fabric having a higher porosity can be obtained by substituting water in a wet web with an organic solvent or a mixture of organic solvent/water followed by drying than those obtained by drying with a drum dryer. It is different depending on a condition but according to the above drying method, a nonwoven fabric having porosity of 60% to 99% can be obtained. Furthermore, a nonwoven fabric of high a porosity of 70% to 90% can be obtained by lyophilization method of a wet web. The porosity can be designed in a preferable range of the present invention by selecting these drying method and a more detailed condition (kinds of drying time and organic solvent to substitute) appropriately.

A nonwoven fabric having a high porosity can be obtained at one step substitution by using an organic solvent having some solubility for water when drying after substitution with an organic solvent. Such solvents include methyl ethyl ketone, isopropyl alcohol, tert-butyl alcohol, isobutyl alcohol but it is not limited to these in particular. It is easier to prepare a nonwoven fabric with higher porosity by using a more hydrophobic solvent. Organic solvents having dielectric constant not more than 3 which are low-polar hydrophobic solvents such as aliphatic hydrocarbon, cyclic hydrocarbon, aromatic hydrocarbon, halogenated hydrocarbon can be preferably used as a method to obtain a nonwoven fabric of high porosity (more than 75%). Specifically, cyclohexane, toluene, carbon tetrachloride, etc. can be mentioned.

When a solvent contained in a wet web is water and to be substituted with an organic solvent which does not dissolve in water such as cyclohexane and toluene, two-step substitution comprising substituting with an organic solvent which dissolves in water such as acetone, methyl ethyl ketone, isopropyl alcohol, isobutyl alcohol at first and then substituting a solvent which is a water-insoluble such as cyclohexane and toluene is effective. The solvent used in this case may be a mixed solvent with water or a mixed solvent between organic solvents. The drying method is not limited to these and, a nonwoven fabric with a high porosity can be also obtained, for example, by lyophilization from a wet web using water as a medium. The cellulosic nonwoven fabric having a fine porous structure can be obtained by using a hydrophobic organic solvent or a mixed medium which is rich in hydrophobic organic solvent as a dispersant in the dispersion for paper making beforehand. The suitable drying method can be selected depending on the purpose.

In the present invention, the nonwoven fabric comprising cellulose fibers can be made as a continuous nonwoven fabric having a sheet thickness in a range of 5 μm or more and 200 μm or less obtained by artificial sheet forming processes such as paper making and coating. The sheet thickness is preferably 5 μm or more, preferably 10 μm or more and more preferably 12 μm or more from the strength of viewpoint of nonwoven fabric. The upper limit of sheet thickness is 200 μm or less, preferably 160 μm or less, more preferably 130 μm or less, depending on productivity and process control. It is essential to carry out sheet forming by continuous paper making and continuous coating under the conditions described above to produce continuous nonwoven fabrics. In the case of continuous coating, sheet forming is performed by continuous sheet forming processes of coating method, and, for example, a dispersion of cellulose fibers is applied on a running support (belt) and this is continually moved until to drying step and a nonwoven fabric is peeled off the support and wound after drying. The porosity of the nonwoven fabric is controlled by a dispersant of dispersion and composition of an additive.

In the case of continuous paper making, in particular when the applied weight of a nonwoven fabric is 15 $g/m^2$ or less, it is effective to provide continuous supports at intervals between paper making step and drying step, or at each interval in the steps of paper making step/substitution step/drying step so that no breakage of the web occurs. This is because there are cases that strength of a wet web is not enough to go across the interval between the steps in paper making for cellulose fibers of fine fiber diameter and small setting condition with applied weight of 15 $g/m^2$ or less. When the support is used, it is preferable that the support run in close contact with the nonwoven fabric of the present invention to the vicinity of the entrance or exit of the drying step and in addition, a nonwoven fabric is peeled off from the supports in the vicinity of entrance or exit of the drying step, and materials for the supports should be selected considering that smooth detachment is important. The supports can be substituted with the filter cloth to be used at the paper making step. In this case, the nonwoven fabric is peeled off from the supporting filter cloth after the drying step and then wound off in the paper making as mentioned above. In doing so, good detachment from the filter cloth is important because it significantly affects the quality of a nonwoven fabric. In addition, when the nonwoven fabric and the support are used separately, the wet web should be moved from the filter cloth onto the support after having performed press treatment after paper making and techniques of transcription and picking-up roll can be used for this.

The cellulose nonwoven fabric in the present invention can be used as a separator for electric storage devices and functional filters and besides optical materials and electronic board with low linear expansion characteristics by hybridizing with various resins. In addition, it can be suitably used as consumer products such as absorbent paper as super extra-fine fiber and base materials for various adsorbent agents due to the extremely large surface area. Essentially, nonwoven fabric of the present invention can be used for all applications corresponding to the characteristic described above.

Fine fibers other than cellulose and an arbitrary additive can be added depending on each purpose in the present invention as long as the effect of the present invention is not deteriorated significantly. The ingredients other than cellulose in the nonwoven fabric of the present invention is preferably less than 50% by weight, more preferably less than 40% by weight and most preferably less than 20% by weight in order to exhibit the effects of the present invention.

Fibers other than cellulose fibers of this case are as described above and, examples of other additives include organic polymer (for example, aromatic polyamide and aromatic polyester, aromatic polyimide, aliphatic polyamide, aliphatic polyester, polyketone, polylactic acid, polyolefins, ABS resin, polyacetal, polyamino acids, cellulose derivatives) or a polymer having a silicone skeleton (for example, polymethyl siloxane) in the form of resin and rubber-like polymers, and further inorganic fillers, pigments such as iron oxide, lubricants such as stearic acid, behenic acid, zinc stearate, calcium stearate, magnesium stearate, ethylenebis stearamide, mold release agents, softeners/plasticizers such as paraffin process oil, naphthene process oil, aromatic process oil, paraffin, organic poly siloxane, mineral oil, antioxidants such as hindered phenolic antioxidant, phosphorus heat stabilizer, hindered amine light stabilizer, benzotriazole UV absorber, fire retardant, antistatic agent, reinforcing agents such as organic fiber, glass fiber, carbon fiber, metal whisker, coloring agents, others additives or mixtures thereof. As a matter of course, they are not limited to these as long as the effect of the present invention is not deteriorated.

The cellulose fibers and nonwoven fabric containing the cellulose fibers of the present invention provided by the above have characteristics that they have excellent dimensional stability at a high temperature, high heat resistance as compared with conventional cellulose shaped articles, and besides high strength and low linear expansion coefficient can be expected even if they are made thin and designed to have large porosity due to structural characteristics that extremely fine cellulose fibers constituting fine porous structure and that the cellulose fibers are highly crystalline and highly elastic and they are fibers essentially excellent in dimensional stability at a high temperature (coefficient of thermal expansion is low).

Due to these characteristics, the cellulose nonwoven fabric of the present invention can be applied to every technical field where these characteristics can be utilized such as a high-performance filter, high performance paper, life product (cooking sheet, odor absorbing sheet, etc.), a board for semiconductor devices and wiring boards, base materials having low linear expansion coefficient, a separator of the electric storage devices such as capacitors.

For example, the cellulose nonwoven fabric of the present invention can be suitably used as in the following examples. When the cellulose nonwoven fabrics of the present invention are made with a thin sheet thickness and a high porosity (for example, sheet thickness of 30 μm or less, porosity, of 70% or more), they can extremely suitably function in the situation as a separator of electric double layer capacitor where high short-circuit resistance is demanded and the electrolyte is not aqueous (in other words the separator does not swell). That is, since the present invention is a nonwoven fabric, approximately 100% pores present in the film are filled with an electrolyte solution (this is because a nonwoven fabric has only open pore), in comparison with fine porous sheet system, and because the average pore size is smaller than conventional nonwoven fabrics (this is because it comprise fibers having a small fiber diameter) and, even when it is made into a thin film, it is excellent in short-circuit resistance, and besides low internal resistance of thin film can be expected. Furthermore, the separator capable of taking a thinner film form means that packing efficiency in a capacitor cell can be increased and contributes to improvement of a volume energy concentration of a capacitor. Such an effect can be also expected in a separator for electric storage devices using other organic electrolytes such as a separator for a secondary lithium ion battery.

In addition, a composite material having a high transparency and extremely small linear expansion coefficient can be provided by impregnating a cellulose nonwoven fabric of the present invention with monomers of a thermoset resin and carrying out curing by heat curing or ultraviolet irradiation. As a transmittance of composite material, 70% or more, preferably 80% or more can be expected by a parallel light transmittance and, as for a linear expansion coefficient relating to thermal expansion, for example, as an average linear expansion coefficient at 30° C. to 150° C., 20 ppm or less, preferably 10 ppm or less can be expected. Considering that the average linear expansion coefficient in the same condition of a commonly used transparent resin film is about 50 ppm or more, the present invention can be positioned to a material having an extremely small thermal expansion. The composite can be provided with lightweightness and impact resistance as an alternative for glass substrate in display devices such as liquid crystal displays such as TFT or STN, and organic electroluminescence (EL) displays. In addition, the material can extremely suitably function as a board of the devices in which flexibility to some extent is demanded such as electronic paper.

However, use of cellulose fibers and nonwoven fabrics of the present invention are not limited to the field given here.

EXAMPLES

The present invention will be described more specifically by way of examples of the present invention and comparative examples as follows, but the present invention is not limited to these examples.

Example 1

After a polysaccharide production medium culture (Polysaccharide-production medium, Akihiko Shimada, Viva Origino, 23, 1, 52-53, 1995) supplemented with 2.0% of D-glucose was subjected to sterilization treatment with high pressure steam and 1000 L thereof was placed in a fermenter having a volume of 3000 L, inoculated with CJF-002 strain so as to attain 104 CFU/ml and agitation cultured by bubbling at 30° C. under ventilation for two days. Cellulosic materials (BC, degree of polymerization: 3700) in independent form which constitutes macrofibrils radially from a central domain or linked forms were obtained by this agitation culturing.

The obtained cellulosic material was then separated by filtration with a screen mesh, washed with water, compressed and immersed in 1% by weight of aqueous sodium hydroxide solution, heat-treated a at 80° C. for 60 minutes, cooled and then neutralized with sulfuric acid and compressed again. Furthermore, washing with water and compression were repeat three times and an aqueous dispersion of flocculent cellulose (cellulose content: 20.3% by weight) was obtained. Particularly, each of the compression steps was performed using a screw press dehydrater (Model: SHX-200×1500 L) manufactured by FUKOKU KOGYO CO., LTD., so that solid content ratio was 18 to 23% by weight at each step). The obtained cellulose dispersion is designated as cellulose raw material M1.

Next, this M1 was diluted it with water (ion-exchange water) so that the cellulose concentration was 0.5% by weight, preliminarily dispersed with a household mixer for five minutes and then dispersion treatment under operation pressure of 100 MPa was performed twice using a high pressure homogenizer (manufactured by Niro Soavi Corp. (Italy), NS3015H). Then, a dispersion having a cellulose concentration of 0.5% by weight was further diluted with water (ion-exchange water) so that the cellulose concentration was 0.1% by weight and dispersion treatment was performed with a household mixer for five minutes and the obtained dispersion was used as a dispersion for paper making.

The measurement of this dispersion for this paper making revealed that the average dispersion diameter Rv was 72 µm. In addition, the maximum fiber diameter was 260 nm, an average fiber diameter was 65 nm according to SEM observation of the dried body obtained by lyophilizing this dispersion after dehydration, and according to the measurement of solid NMR, crystallinity was 83%, the nitrogen content was 0.14%, TOC of the contact water was 20 ppm, and concentration of chlorine ion was 23 ppm. From these results, it was confirmed that this dispersion was a dispersion of cellulose fibers of the present invention.

Then, the dispersion for paper making evaluated for cellulose (BC) as mentioned above was used for paper making using a filter cloth of a PET textile with a filtration capacity rated at at least 99% (fiber thickness of about 40 µm, 460 mesh, amount of water permeation under atmospheric pressure at 25° C.: 0.05 ml/cm$^2$/s) cut for size (25 cm×25 cm) of square metal wires and a batch type paper making machine (manufactured by Kumagaya Riki Kogyo, Co., Ltd., automatic square type sheet machine). The PET textile described above was installed on the square metal wires (25 cm×25 cm) incorporated in the paper machine and 850 g and 425 g of the dispersion for paper making was injected into to the paper machine thereon and paper making was carried out under two kinds of conditions without using suction (decompresser).

The obtained nonwoven fabric in the wet condition was pressed and dehydrated with a metal roller and the cellulose concentration was adjusted to be 12 to 13% by weight. This wet nonwoven fabric was dried by two kinds of methods and nonwoven fabrics with different porosity were prepared.

The first drying method was performed by immersing the fabric in acetone without peeling off the PET textile and substitution treatment was carried out while gently rinsing for about 10 minutes and then the fabric was immersed in a mixture of toluene/acetone=30/70 (g/g) and substitution treatment was carried out while occasionally gently rinsing for about 10 minutes. Immediately after that, the wet web sandwiched with the filter cloth was placed on a metal plate and dried with weight thereon so that it was dried with fixed dimension at 50° C. for 60 minutes. After drying, a white cellulose nonwoven fabric was obtained by peeling off the sheet from the filter cloth. The nonwoven fabric obtained from 850 g feed was designated as BC-1 and that obtained from 425 g feed was designated as BC-2. BC-1 has a sheet thickness of 43 µm and a porosity of 82%, while BC-2 has a sheet thickness of 22 µm and a porosity of 83%.

As the second drying method, a PET filter cloth of the same size was put on the wet nonwoven fabric deposited on the PET filter cloth obtained in the paper making with 850 g of the above dispersion for paper making and this three-layered laminate was attached onto a drum dryer whose surface temperature was set to 95° C. and dried for a drying time of 60 seconds. After drying, the filter cloths made of PET on the both sides of the cellulose laminate were peeled off and a semitransparent white sheet-like cellulose shaped article BC-3 having a sheet thickness of 26 µm and a porosity of 45% was obtained.

The obtained three nonwoven fabrics BC-1, BC-2 and BC-3 were observed with SEM and it was confirmed that all of these nonwoven fabric samples has a maximum fiber diameter and an average fiber diameter equivalent to cellulose fibers in the dispersion for paper making/cellulose fibers in the aqueous dispersion. It was also confirmed that all of three nonwoven fabrics have a nitrogen content, TOC in contact water and a concentration of Chlorine ion component approximately equivalent to dried body from the dispersion for paper making described above and satisfy the preferable conditions of the nonwoven fabric of the present invention.

Average transmittance Tr,av of the obtained nonwoven fabric impregnated with toluene was 0.95 (BC-1), 0.97 (BC-2) and 0.93 (BC-3) and uniformity parameter H was 0.0028 (BC-1), 0.0022 (BC-2) and 0.0031 (BC-3). In addition, unevenness parameter H' was measured for dry nonwoven fabrics, which was 0.096 (BC-1), 0.102 (BC-2) and 0.064 (BC-3) and the appearance was also excellent in uniformity.

The results on the variation in the quality of nonwoven fabrics BC-1 and BC-2 (air permeability and tensile strength (the number of examination was respectively 10) were in Table 1 and it was confirmed that variation in the quality were narrower than the comparative examples described later and it became clear that the cellulose nonwoven fabrics of the present invention suitably function in the point of uniformity of quality.

The structural factors and the results of heat resistance evaluation under atmospheric environment at 180° C. for 72 hours of these three samples are shown in Table 2. It was confirmed that BC-1 to BC-3 have high heat resistance in that they showed almost no decrease in the degree of discoloration and tensile strength. There was almost no change in the fragility before and after heat-treatment when the shaped articles were touched with hands. Furthermore, average linear expansion coefficient at 30° C. to 250° C. of the three samples are also shown in Table 2. Each of the samples showed linear expansion coefficient equal to or less than 10 ppm/° C., which confirmed that they have greatly low values as compared with resins whose average linear expansion coefficient is generally 50 ppm/° C. or more. That is, it became clear that the samples of BC-1 to BC-3 are nonwoven fabrics excellent in dimensional stability although have large porosity as high as 40% or more.

Example 2

Raw cotton for cotton linters was subjected to steaming treatment in 6% NaOH aqueous solution (170° C., 90 minutes) and chlorine bleaching treatment (30° C.), and then washed with water and dehydrated and the thus obtained purified cotton linter M3 (solid content: 50% by weight, degree of polymerization: 900) was immersed in water so as to be 5% by weight and heat-treated at 130° C. for four hours in an autoclave. After treatment, slightly yellowed liquid was removed, and washing with water and dehydration was repeated twice to obtain purified cotton linter M4 (50 solid content % by weight, degree of polymerization: 900).

The purified cotton linter M4 was disperse in water (ion-exchange water) so as to be 1.0% by weight, treated with a beater (manufactured by Kumagaya Rikaki Kogyo Co., Ltd., device for 23 L) for two hours and then dispersion treatment under operation pressure of 100 MPa was performed 20 times using a high pressure homogenizer (manufactured by Niro Soavi Corp. (Italy), NS3015H). Next, this dispersion with a cellulose concentration of 1.0% by weight was further diluted with water (ion-exchange water) so that the cellulose concentration was 0.10% by weight, dispersed with a household mixer for 10 minutes and the obtained dispersion was used as a dispersion for paper making. The measurement of this dispersion for paper making revealed that the average dispersion diameter Rv was 53 μm.

Paper making was performed using a PET textile (fiber thickness of about 40 μm, 460 mesh) cut for size (25 cm×25 cm) of square wires made of metal used below as a filter cloth and a batch type paper making machine (manufactured by Kumagaya Riki Kogyo, Co., Ltd., automatic square type sheet machine) in the same manner as in Example 1. The PET textile described above was installed on the square metal wires (25 cm×25 cm, filtration rate of cellulose when the dispersion for paper making was used: 30% or less) incorporated in the paper machine and 930 g and 310 g of the dispersion for paper making was injected into to the paper machine thereon and paper making was carried out under two kinds of feed amount using suction (decompresser).

The obtained wet web was further covered with the same filter cloth and pressed and dehydrated with a metal roller and the cellulose concentration was adjusted to be 12 to 13% by weight. The obtained wet web was immersed in isobutyl alcohol without peeling off the PET textile and substitution treatment was carried out while gently rinsing the entire at intervals as well for about 10 minutes. Immediately after that, the wet web sandwiched with the filter cloth was placed on a metal plate and dried with weight thereon so that it was dried with fixed dimension and set in a dry oven and dried at 100° C. for 50 minutes. After drying, white cellulose nonwoven fabrics with two types of applied weight were obtained by peeling off the sheet from the filter cloth.

Of these, when the nonwoven fabric obtained from 930 g feed paper making was designated as CL-1 and the nonwoven fabric obtained from 310 g feed paper making was designated as CL-2, CL-1 has a sheet thickness of 57 μm and a porosity of 81%, while CL-2 has a sheet thickness of 23 μm and a porosity of 84%.

The crystallinity of CL-1 and CL-2 determined by solid state NMR techniques was both 74%. The maximum fiber diameter determined in SEM images was 1170 nm (CL-1) and 1090 nm (CL-2), the number average fiber diameter was 95 nm (CL-1) and 94 nm (CL-2). Furthermore, according to the measurement of distribution of transmittance under immersion with toluene described above, Tr,av was 0.89 for CL-1 and 0.94 for BC-2, and the value of uniformity parameter of film quality H was 0.0053 for BC-1 and 0.0038 for BC-2. Furthermore, unevenness parameter H' is 0.071 (CL-1) and 0.088 (CL-2) and it was confirmed that the both were nonwoven fabrics of the present invention.

For the purpose of comparison, cellulose nonwoven fabric CL-3 was obtained by using purified linter M3 which was not heat-treated in an autoclave in the above and thereafter downsizing by high pressure homogenizer, preparing the same dispersion for paper making as in the sheet forming of CL-1, paper making and drying under the same conditions as in the operations on M4 in the above example. The porosity of CL-3 was 82%, and the sheet thickness was 59 μm. The crystallinity determined by solid state NMR techniques of CL-3 was similar to CL-1 but the fiber diameter and number average fiber diameter that it depended among SEM images, and it was decided at the maximum were each, 1,410 nm and 111 nm, which suggested that downsizing of linter fiber is a little as compared with CL-1.

In addition, value of Tr,av was 0.82, by the measurement of transmittance distribution under immersion with toluene described above, the value of quality uniformity of film H was 0.0068, unevenness parameter H' was 0.111, and it proved that although CL-3 was a nonwoven fabric of the present invention, it was a nonwoven fabric a little inferior in performance to CL-1 at a point of transparency exhibition when hybridized with a resin. This means that heat-treatment in an autoclave performed on M4 was an effective method to produce cellulose fiber having fine fiber system of the present invention effectively.

The results of estimation on the variation in the quality of nonwoven fabrics CL-1 to CL-3 were shown in Table 1 and the results of estimation on the heat resistance and average linear expansion coefficient were shown in Table 2, which shows that each of them was a cellulose nonwoven fabric of the present invention having little variation in the quality and excellent in heat resistance.

Example 3

Paper making using 850 g of a dispersion for paper making was performed under the same conditions as in sheet forming by the paper making method of BC-1 in Example 1 except that the filter cloth made by PET was not used. The waste fluid (filtrate) at this time of a paper making process was tinged with whiteness slightly, which suggested that fine cellulose fibers were contained in the filtrate. The organic solvent substitution and drying were also performed in the same steps as in those for BC-1 and white cellulose nonwoven fabric BC-4 was obtained.

BC-4 was a nonwoven fabric having a sheet thickness of 26 μm and a porosity of 74%. The results of estimation on the variation in the quality of BC-4 were shown in Table 1, which suggested that it was a nonwoven fabric having a relatively large pore size because the porosity was a little lower and air permeability showed a lower value as compared with BC-1. At the same time, unevenness parameter H' was as large as 0.42 which definitely reflected in the variation of air permeability and tensile strength. It was shown that use of a filter cloth prescribed in the present invention was effective to produce highly uniform nonwoven fabrics, as compared with the results of Example 1, in the production of a cellulose nonwoven fabric of the present invention.

Example 4

Dispersion M1 obtained in Example 1 was diluted with water so that the cellulose concentration was 0.5% by weight and after preliminarily dispersed with a household mixer for five minutes, dispersion treatment under operation pressure of 40 MPa was performed once using a high pressure homogenizer (manufactured by Niro Soavi Corp. (Italy), NS3015H). Then, this dispersion having a cellulose concentration of 0.5% by weight was further diluted with water so that the cellulose concentration was 0.1% by weight and dispersion treatment was performed with a household mixer for five minutes and the obtained dispersion was used as a dispersion for paper making.

According to SEM observation on the maximum fiber thickness of this dispersion, no fibers having a thickness exceeding 400 nm was recognized and the average dispersion diameter Rv was 320 μm.

This dispersion was used as a dispersion for paper making and paper making using 425 g of a dispersion was performed as in Example 1 following the conditions of paper making of BC-2 and finally white cellulose nonwoven fabric BC-5 was obtained. BC-5 had a sheet thickness of 25 μm and a porosity of 80%. The value of non-uniformity parameter H' is 0.48. The results of estimation on the variation in the physical properties of BC-5 as a nonwoven fabric were shown in Table 1. The variation of air permeability and tensile strength of BC-5 were large values in comparison with BC-2. It was shown that control of a dispersion average diameter in a dispersion for paper making significantly affected on the uniformity of the obtained nonwoven fabric.

Example 5

The condition of aqueous sodium hydroxide treatment was changed to 60° for 30 minutes and a step of washing with water after neutralization and compression was performed once in the purification step of BC in Example 1, and cellulose/water dispersion M2 having a solid content concentration of 19.6% by weight was obtained by dehydration compression with a screw press. This M2 was used as a raw material and dispersion and paper making were performed by the same method as a sheet forming process of BC-3 of Example 1 to obtain nonwoven fabric BC-6.

The film characteristic such as crystallinity, maximum fiber diameter and average fiber diameter of BC-6 were the same as BC-3 and the sheet thickness was 27 μm and porosity was 41% and the nitrogen content of BC-6 was 0.66%, TOC on the contact water was 82 ppm, and the chlorine ion content was 42 ppm. The results of heat-resistant evaluation of BC-6 at 180° C. for 72 hours under atmospheric environment were shown in Table 2. The degree of discoloration and tensile strength after heat resistance test were more excellent in BC-3, which showed that to increase the purification degree of cellulose fiber to be used as raw materials was effective as means to exhibit high heat resistance in the production of a cellulose nonwoven fabric of the present invention.

Comparative Example 1

Celish (provided by Daisel chemistry company, Celish KY-100G, a water dispersion having a cellulose concentration of 10% by weight) was used which is a finely pulverized pulp fiber in substitution for cellulose raw material M1 In the paper making process of Example 1, and water (ion-exchange water) was added to this so that the cellulose concentration was 0.1% by weight and dispersed with a household mixer for five minutes and the obtained dispersion was used as a dispersion for paper making. Cellulose nonwoven fabric R-1 having a sheet thickness of 29 μm and a porosity of 46% was obtained using a method totally the same as that for BC-3 in Example 1 for the paper making and drying steps. The crystallinity determined by solid state NMR techniques of R-1 was 56%, the nitrogen content of R-1 was 0.02%, TOC of the contact water was 8 ppm, and the chlorine ion content was 6 ppm. The maximum fiber diameter was 1820 nm, the average fiber diameter was 130 nm according to SEM observation of R-1. R-1 had extremely little impurities, but it could not to be said as a cellulose nonwoven fabric of the present invention in that the maximum fiber diameter exceeded 1500 nm.

The average transmittance of R-1 measured under toluene impregnation Tr,av was 0.41 and the uniformity parameter H was 0.0077. Uniformity parameter H' of R-1 was 0.085, and it was a excellent nonwoven fabric in uniformity as an appearance, but it did not exhibit transparency when hybridized with a material having a different refractive index suggesting that it was a nonwoven fabric of which the effects of the present invention cannot be expected.

The results of heat-resistant evaluation of R-1 at 180° C. for 72 hours under atmospheric environment were shown in Table 2. The degree of discoloration showed larger value in comparison with samples shown in each Example, suggesting that heat deterioration was worse in R-1. R-1 after heat treatment showed decrease in the tensile strength and in addition, mentioning about the fragility when touched with hands, R-1 after heat treatment collapsed when it was lightly rubbed and that deterioration of physic clearly was confirmed.

Comparative Example 2

Sisal hemp (fiber thickness about 10 μm) diluted with water so that the cellulose concentration was 0.02% by weight and dispersion treatment was performed with a household mixer for ten minutes, and paper making was performed with a batch type paper making machine described above using 4650 g of the obtained dispersion was performed. Paper making was performed by suction (decompresser) without installing filter cloth on the square metal wires incorporated in the paper machine. The obtained wet web was dehydrated with a metal roller and the cellulose concentration was adjusted to be 25 to 30% by weight. The obtained wet web was attached onto a drum dryer whose surface temperature was set to 100° C. and dried for a drying time of 180 seconds and thereby a white cellulose nonwoven fabric R-2 having a sheet thickness of 50 µm and a porosity of 74% was obtained.

Crystallinity determined by solid state NMR techniques of R-2 was 55%, and only fiber of a fiber diameter of about 10 µm to 15 µm was confirmed in SEM images, and R-2 was a nonwoven fabric which could not to be said as a cellulose nonwoven fabric of the present invention from the viewpoint of crystallinity and fiber diameter. The average transmittance of R-2 measured under toluene impregnation Tr,av was 0.44 and the sheet uniformity parameter H was 0.035, and the uniformity parameter H' was 0.076. This suggested that it did not exhibit transparency when hybridized with a material having a different refractive index and that it was a nonwoven fabric of which the effects insisted by the present invention cannot be expected.

Furthermore, the results of heat-resistant evaluation of R-2 at 180° C. for 72 hours under atmospheric environment shown in Table 2 showed that heat deterioration was worse in R-2 from degree of discoloration and decrease in tensile strength after heat treatment as compared with samples shown in each Example, and that it was a nonwoven fabric which was largely inferior to the nonwoven fabric of the present invention in the point of average linear expansion coefficient.

Comparative Example 3

An acetic acid bacteria was cultured to obtain cellulose. Culturing was performed as a static culturing in a laboratory dish having a inside diameter of 10 cm by standard condition using Hestrin-Schramm medium culture ("Cellulose dictionary" ed. by the Cellulose Society of Japan, Asakura Shoten, published 2000, p.44) with fructose as a carbon source, at pH6 and a temperature of 28° C. for eight days. The obtained semitransparent gel having a sheet thickness of about 2 mm was subjected to bacteriolytic treatment in an autoclave device at 120° C. for one hour while immersed in 2% by weight aqueous solution of sodium hydroxide.

The wet gel was further washed with water and then subjected to bacteriolytic treatment in an autoclave under the same condition again and a wet gel sheet was obtained. After this gel was immersed in a sufficient amount of cold water at 4° C. and allowed to stand still for two hours, it was compressed between filter papers. The steps of immersion in cold water and compression were repeated four times under the same condition and a compressed gel static culture sheet was obtained. The static culture sheet without being immersed in isobutyl alcohol was attached onto a drum dryer whose surface temperature was set to 100° C. and dried for a drying time of 180 seconds, and a semitransparent cellulose nonwoven fabric R-3 having a sheet thickness of 20 µm and a porosity of 32% which did not belong to the present invention was obtained.

Crystallinity determined by solid state NMR techniques of R-3 was 80%, and, from the SEM image, the maximum fiber diameter was 220 nm and the average fiber diameter was 75 nm. According to the measurement of the distribution of transmittances under toluene impregnation mentioned above, Tr,av was 0.89 and the sheet uniformity parameter H was 0.0035, but in the Tr,av measurements of the nonwoven fabric there was observed an event that values of transmittance increased as time passed (such an event was not observed in any other nonwoven fabric in Examples and Comparative Examples). It needed about 3 hours till it finally settled down to the value of above $T_{r,av}$. This meant that it needed a large length of time for toluene to impregnate the sheet, and it became clear that R-3 was a nonwoven fabric which was extremely hard to be hybridized.

Example 6

The purified cotton linter M4 used in Example 2 was dispersed in water (ion-exchange water) so as to be 1.0% by weight, treated with a beater (manufactured by Kumagaya Riki Kogyo Co., Ltd., device for 23 L) for two hours and then downsizing treatment under operation pressure of 100 MPa was performed 40 times using a high pressure homogenizer (manufactured by Niro Soavi Corp. (Italy), NS3015H). Next, this dispersion with a cellulose concentration of 1.0% by weight was further diluted with water (ion-exchange water) so that the cellulose concentration was 0.20% by weight, dispersed with a household mixer for 10 minutes and the obtained dispersion (average dispersion diameter: 60 µm) was used as a dispersion for paper making and sheet forming was performed changing filter cloths used.

That is, batch type paper making was performed in the same manner as in Example 2 except that the feeding amount of the dispersion for paper making was changed to 930 g and a flat-woven textile (product of Shikishima Canvas Co., Ltd., NT20, amount of water permeation under atmosphere at 25° C.: 0.03 ml/cm$^2$·s) made of PET/nylon blend capable of separatively filtering, under the atmospheric pressure at 25° C., 99% or more of cellulose (finely pulverized cellulose linters) evaluated for the dispersion for paper making was cut for the size (25 cm×25 cm) of square wires made of metal used below as a filter cloth.

The wet web obtained by paper making was further covered with the same filter cloth and dehydrated with a metal roller and the cellulose concentration was adjusted to be 12 to 13% by weight. The obtained wet web without being peeled off from the filter cloth was immersed in isobutyl alcohol and substitution treatment was carried out while gently rinsing the entire at intervals as well for about 15 minutes. Immediately after that, the wet web sandwiched with the filter cloth was placed on a metal plate and dried with weight thereon so that it was dried with fixed dimension and set in a dry oven and dried at 100° C. for 50 minutes. After drying, white cellulose nonwoven fabric CL-4 was obtained by peeling off the nonwoven fabric from the filter cloth.

CL-4 has a porosity of 78% and a sheet thickness of 96 µm. The crystallinity determined by solid state NMR techniques was 74%, the maximum fiber diameter determined in SEM images was 1100 nm and the number average fiber diameter was 94 nm. Furthermore, according to the measurement of distribution of transmittance under immersion with toluene described above, Tr,av was 0.81 and the value of uniformity parameter of film quality H was 0.0067. Furthermore, non-uniformity parameter H' was 0.045 and it was confirmed that it was a nonwoven fabric of the present invention. It was suggested that although CL-4 has a sheet thickness of about 100 µm, the values of Tr,av exceeded 0.8, and that a highly transparent film could be provided by forming a composite with a resin or the like having different refraction index.

Example 7

The BC/water dispersion M1 described above was used. It was mixed with water, diluted with water and ethanol so that the resulting dispersion had a composition by weight ratio of cellulose/ethanol/water at 1/29/70, and preliminarily dispersed with a household mixer for ten minutes and then dispersion treatment under operation pressure of 175 MPa was performed ten times using a superhigh pressure homogenizer (Microfluidizer manufactured by Mizuho Industrial Co., Ltd., M-110EH). The average dispersion diameter $R_v$ of the obtained dispersion was measured and it proved to be 290 µm.

Then, this dispersion having a cellulose concentration of 1.0% by weight was poured onto a glass plate of a square of size of 20 cm×20 cm with a frame for preventing it from flowing out in the circumference at a height of 200 µm to fill the inside wall of the frame, and moved as it is into a drying oven set at 90° C. and dried for two hours to prepare a cellulose nonwoven fabric by coating method.

After drying, the cellulose semitransparent film (cellulose nonwoven fabric (sheet thickness: 20 µm, porosity: 42%, hereinbelow BC-7)) was peeled off from the glass plate. The crystallinity determined by solid state NMR techniques of BC-7 was 83%, the maximum fiber diameter determined by SEM image was 280 nm and the average fiber diameter was 67 nm. Furthermore, according to the measurement of distribution of transmittance under immersion with toluene described above, Tr,av was 0.90 and the value of uniformity parameter of film quality H was 0.0055 and non-uniformity parameter H' was 0.072 and it was confirmed that BC-7 was a cellulose nonwoven fabric of the present invention.

Example 8

Dice pieces of Nata de coco (product of Fujicco Co., Ltd., solid content ratio: 0.5% by weight) which is a water-containing BC gel used for food material was sufficiently washed with water (complete substitution to water under a water current) and compressed to prepare a BC/water dispersion having a solid content of 12% by weight. The dispersion was added with water and diluted with water so that the cellulose concentration was 1.0% by weight and after preliminarily dispersed with a household mixer for ten minutes, dispersion treatment under operation pressure of 80 MPa was performed four times using a high pressure homogenizer (manufactured by Niro Soavi Corp. (Italy), NS3015H).

Then, this dispersion having a cellulose concentration of 1.0% by weight was further diluted with water so that the cellulose concentration was 0.10% by weight and dispersion treatment was performed with a household mixer for five minutes and the obtained dispersion was used as a dispersion for paper making. The average dispersion diameter $R_v$ of the obtained dispersion was measured and it proved to be 55 µm.

Next, a flat-woven textile (product of Shikishima Canvas Co., Ltd., NT20) made of PET/nylon blend used in Example 6 was used and paper making was performed in the same manner as in Example 6 using a batch type paper machine. Only 1330 g of the dispersion for paper making was spread in the paper machine and paper making was carried out using suction (decompresser). The wet web obtained by paper making was further covered with the same filter cloth and dehydrated with a metal roller and the cellulose concentration was adjusted to be 12 to 13% by weight. The obtained wet web without being peeled off from the filter cloth was immersed in isobutyl alcohol and substitution treatment was carried out while gently rinsing the entirety at intervals for about 15 minutes, and after that, the wet web sandwiched with the filter cloth was placed on a metal plate and dried with weight thereon so that it was dried with fixed dimension and set in a dry oven and dried at 100° C. for 50 minutes. After drying, a white cellulose nonwoven fabric (sheet thickness: 65 µm, porosity: 78%, hereinbelow referred to as BC-8) was obtained by peeling off the nonwoven fabric from the filter cloth.

The crystallinity of BC-8 determined by solid state NMR techniques was 82%, the maximum fiber diameter determined in SEM images was 210 nm and the average fiber diameter was 75 nm. Furthermore, according to the measurement of distribution of transmittance under immersion with toluene described above, Tr,av was 0.91 and the value of uniformity parameter of film quality H was 0.0040, non-uniformity parameter H' was 0.062.

Example 9

The dispersion M1 obtained in Example 1 was diluted with water so that the cellulose concentration was 1.0% by weight, subjected to continuous dispersion treatment equivalent to 15 times in a dispersion machine for paper making, Discrefiner (manufactured by Kumagaya Riki Kogyo, Co., Ltd, No. 2500-1, KRK High Level Discrefiner, Type D used as refiner plate) and then dispersion treatment under operation pressure of 100 MPa was performed four times using a high pressure homogenizer (manufactured by Niro Soavi Corp. (Italy), NS3015H).

This dispersion having a cellulose concentration of 0.5% by weight was further diluted with water so that the cellulose concentration was 0.25% by weight, subjected to continuous dispersion treatment equivalent to 10 times in Discrefiner again and the obtained dispersion was used as a dispersion for paper making. The measurement of this dispersion for paper making revealed that the average dispersion diameter $R_v$ was 65 µm.

A slant wire type continuous paper making device (manufactured by Saito Ironworks Co., Ltd.) with a slant angle set to 5° and width set to 0.65 m was used and a flat-woven textile made of PET/nylon blend used in Example 3 (roll of 0.76 m in width×100 m in length) was continuously placed on the polyolefin wires (filtration ratio of cellulose when a dispersion for paper making used in this Example is used: 64%) normally used in the device as a filter cloth and continuous paper making was carried out by continuously feeding the dispersion for paper making obtained above at a feeding rate of 6.5 L/min with paper making throughput rate of 6 m/min and operating the wet suction (slant part) with a setting of reduced differential pressure of 60 mmHg and the dry suction with a setting of reduced differential pressure of 350 mmHg. A dehydrating step was provided by a metal roll immediately after paper making, and the wet web which passed through this step had a cellulose concentration of 11% by weight.

The two-layered wet web/filter cloth was as it was immersed in a substitution bath filled with largely excess amount of isobutyl alcohol with the immersed time of 20 minutes and a filter cloth was also continuously placed on the upper part of the nonwoven fabric just emerged out of the bath to form a three-layer structure of filter cloth/nonwoven fabric/filter cloth, and then it was dried with a drum dryer whose surface temperature was set to 100° C. and the nonwoven fabric were peeled off from the upper and lower filter cloths immediately after it is dried to obtain a continuous cellulose nonwoven fabric (hereinbelow, BC-9)

The porosity of BC-9 was 85%, and the sheet thickness was 26 µm. The crystallinity of BC-9 determined by solid state NMR techniques was 83%, the maximum fiber diameter determined in SEM images was 300 nm and the average fiber diameter was 69 nm. Furthermore, according to the measurement of distribution of transmittance under immersion with toluene described above, $T_{r,av}$ was 0.95 and the value of uniformity parameter of film quality H was 0.0025, non-uniformity parameter H' was 0.077.

The average air permeability of BC-9 was 38 s/100 ml and the variation thereof was 6.2%. The average of tensile strength was 5.2 MPa and the variation thereof was 16%, and it proved to be a film having a narrow variation in quality as compared with the results of nonwoven fabric samples which had comparable sheet thickness and porosity shown in Table 1 (for example, BC-2). This Example shows that the a cellulose nonwoven fabric of the present invention can be stably produced for by a continuous paper making process, and, in addition, confirmed that the quality of the nonwoven fabric thereof is equal to that obtained by batch type paper making.

Example 10

The static culture sheet containing water after compression obtained in Comparative Example 3 was immersed in isobutyl alcohol and substitution treatment was carried out while gently rinsing the entire at intervals for about 45 minutes, and after that, the film sandwiched with the above mentioned filter cloth made of PET was placed on a metal plate and dried with weight thereon so that it was dried with fixed dimension and set in a dry oven and dried at 100° C. for 50 minutes. After drying, a white cellulose nonwoven fabric obtained by static culture was obtained by peeling off the nonwoven fabric from the filter cloth.

The porosity of a nonwoven fabric (hereinbelow, BC-10s) which contained the obtained cellulose was 78%, and the sheet thickness was 85 μm. The crystallinity of BC-7 determined by solid state NMR techniques was 80%, the maximum fiber diameter determined in SEM images was 225 nm and the average fiber diameter was 73 nm. Furthermore, according to the measurement of distribution of transmittance under immersion with toluene described above, Tr,av was 0.93 and the value of uniformity parameter of film quality H was 0.0030. When BC-10 was compared with a BC static culture sheet (R-3) shown in Comparative Example 3 whose porosity was 32%, Tr,av under immersion with toluene showed an overwhelmingly high value though the sheet thickness was large, and it was confirmed that the nonwoven fabric is excellent in the point of expression of transparency when hybridized with a resin and the like.

Example 11

Purified cotton linter M4 and a cut product of 6,6-nylon fibers used in Example 2 (fiber diameter: about 10 μm, fiber length: about 3 mm) were mixed in a weight ratio of 70/30 and diluted with water so that the solid content concentration was 1.5% by weight. This dispersion was subjected to a treatment with a beater (manufactured by Kumagaya Rikaki Kogyo Co., Ltd., device for 23 L) for two hours and then downsizing treatment under operation pressure of 100 MPa was performed 20 times using a high pressure homogenizer used in Example 2.

Next, this dispersion with a cellulose concentration of 1.0% by weight was further diluted with water (ion-exchange water) so that the cellulose concentration was 0.10% by weight, dispersed with a household mixer for 10 minutes and the obtained dispersion was used as a dispersion for paper making. The dispersion average diameter Rv of this dispersion for paper making was 78 μm when measured.

In the same manner as in Example 1, paper making with a batch type paper machine was performed in completely the same condition for CL-1 using a textile made of PET as a filter cloth below and a white cellulose nonwoven fabric CO-1 containing 15% by weight of nylon. The porosity of CO-1 was 78% and the sheet thickness was 55 μm.

The crystallinity of cellulose in CO-1 determined by solid state NMR techniques was 74%. The maximum fiber diameter determined in SEM images was 1200 nm and the number average fiber diameter was 101 nm. Furthermore, according to the measurement of distribution of transmittance under immersion with toluene described above, Tr,av was 0.87 and the value of uniformity parameter of film quality H was 0.0076, non-uniformity parameter H' was 0.068. Although CO-1 contained 15% of nylon fibers, it proved to have a quality equivalent to CL-1 (nonwoven fabric composed of 100% of finely pulverized linters formed into a film in the same condition) in Example 2 at the points of transparency in toluene impregnation and quality of sheet uniformity. Furthermore, air permeability and tensile strength of CO-1 were 125 s/100 ml and 9.9 MPa respectively, and although the air permeability was slightly smaller as compared with CL-1, the physical properties thereof were comparable. That is, it was confirmed that the cellulose nonwoven fabric of the present invention exhibited the effects claimed in the invention, even if fibers other than cellulose were contained therein.

Evaluation Method

The cellulose nonwoven fabrics prepared in Examples 1 and 2, parts of Comparative Examples 1 to 6 were evaluated by measured air permeability and tensile strength as basic performance evaluation as a film or a separator, degree of discoloration and decrease in tensile strength before and after high temperature heat treatment as heat resistance evaluation and average linear expansion coefficient as evaluation of thermal expansion by the following evaluation methods. The results evaluation are shown in Table 1 and Table 2.

a) Air Permeability (Ventilation Resistance Degree)

The permeation time of 100 ml of air at room temperature was measured using a gurley type densometer (manufactured by Toyo Seiki Co., Ltd., model G-B2C). The evaluation was performed by measuring air permeability at ten arbitrary points per one piece of nonwoven fabric sample and the variation degree was defined and calculated as follows.

Variation degree=|(average)−(observed value having the largest difference from the average)|× 100/(average)

b) Tensile Strength

As an index of uniformity of a nonwoven fabric, five rectangle pieces of 5 mm×50 mm were cut out of the obtained nonwoven fabric sample at an arbitrary position and the measurement of the tensile strength thereof was carried out at room temperature. The measurement was carried out by measuring a stress-strain (S-S) curve and the stress at the breaking moment of a nonwoven fabric was assumed as tensile strength.

The measurement of S-S curve was performed by setting a sample on a tensile testing machine (manufactured by SHIMPO Company, Model FGS-50D) with chucks at a distance of 20 mm and load F (Kg) at the moment when the nonwoven fabric was broken in the process of pulling up the upper chuck at a rate of 9.5 mm/min and the tensile strength W was evaluated by the following formula.

$W=9.8 \times F/(0.005 \times \text{sheet thickness (m)})(\text{MPa})$

The evaluation was performed by measuring air permeability at ten arbitrary points per one piece of nonwoven fabric sample and the variation degree was defined and calculated as follows.

Variation degree=|(average)−(observed value having the largest difference from the average)|× 100/(average)

c) Heat Resistance Evaluation

The tensile strength and color parameter b* were evaluated in a cellulose shaped article in the form of sheet before and after 72 hour heat treatment (under atmospheric environment) at 180° C.

Here, degree of discoloration was determined by $$\Delta b^* = (b^* \text{ after heat-treatment}) - (b^* \text{ before heat-treatment})$$

Heat treatment was carried out the in a hot-air drier under atmospheric pressure. The estimation of b* was performed using Macbeth spectral photometer Color-Eye 3000 model (normal color control system ver. 5.1) manufactured by Sakata Inx Corp., with C source of light and view angle of 20°.

In addition, tensile strength was also measured before and after the heat treatment, and a decrease in strength defined by the following equation was used as index of heat resistance.

Decrease in strength (%)=(Strength before test-Strength after test)×100/Strength before test.

d) Average of Linear Expansion Coefficient

Absolute dry samples of each nonwoven fabric was attached to TMA/SS120 model device manufactured by SEIKO Instruments Corporation, and the rate of change ΔL (%) of the length of a sample when the temperature was elevated at a rate of 5° C. per minute from 50° C. to 250° C. was determined by the following formula:

$$\Delta L = (L_{250} - L_{50})/L_{50}/(250-50)$$

When the sample length at 50° C. is designated as $L_{50}$ and the sample length at 250° C. is designated as $L_{250}$.

The load was 10 g and measured by tensile mode.

TABLE 1

| Sample | Sheet thickness (•m) | Porosity (%) | Air permeability Average (s/100 ml) | Air permeability Variation degree (%) | Tensile strength Average (Mpa) | Tensile strength Variation degree (%) |
|---|---|---|---|---|---|---|
| BC-1 | 43 | 82 | 88 | 4.4 | 9.0 | 13 |
| BC-2 | 22 | 83 | 43 | 7.0 | 6.4 | 28 |
| BC-3 | 26 | 45 | 2000 or more | —[a] | 31 | 11 |
| BC-4 | 26 | 74 | 20 | 100 | 2.5 | 92 |
| BC-5 | 25 | 80 | 39 | 42 | 5.4 | 67 |
| CL-1 | 57 | 81 | 158 | 5.0 | 12 | 9.4 |
| CL-2 | 23 | 84 | 32 | 7.4 | 4.9 | 23 |
| CL-3 | 59 | 82 | 136 | 6.4 | 8.6 | 13 |
| R-1 | 29 | 46 | 2000 or more | —[a] | 18 | 14 |
| R2- | 50 | 74 | 5 or less | —[a] | 15 | 12 |
| R-3 | 20 | 32 | 2000 or more | —[a] | —[b] | —[a] |

[a]Because physical properties cannot be evaluated, determination was impossible,
[b]Persumably 50 Mpa or more Sliding of mounted chuck occurred and determination was impossible.

TABLE 2

| | Change in physical properties before and after heat treatment at 180° C. for 72 hours | | |
|---|---|---|---|
| Sample | Degree of discoloration Δb* | Decrease in strength (%) | Average linear expansion (ppm/° C.) |
| BC-1 | 0.7 | 0[a] | 8 |
| BC-2 | 0.8 | 0[a] | 12 |
| BC-3 | 0.9 | 0[a] | 10 |
| BC-6 | 6.9 | 62 | 16 |
| CL-1 | 2.0 | 15 | 13 |
| CL-2 | 2.4 | 20 | 18 |
| CL-3 | 3.7 | 28 | 20 |

TABLE 2-continued

| | Change in physical properties before and after heat treatment at 180° C. for 72 hours | | |
|---|---|---|---|
| Sample | Degree of discoloration Δb* | Decrease in strength (%) | Average linear expansion (ppm/° C.) |
| R-1 | 11 | 59 | 23 |
| R-2 | 13 | 42 | 48 |

[a]Although a little higher strength was shown after the test than before test, the decrease rate was assumed as 0.

INDUSTRIAL APPLICABILITY

Cellulose nonwoven fabric provided by the present invention can be used as a separator for electric storage devices, functional filters, high performance paper for life product, and besides, optical material and electronic material substrate with low linear expansion characteristics by hybridizing with various resins.

The invention claimed is:

1. A cellulose nonwoven fabric having a porosity of not less than 40% and not more than 99% which comprises not less than 50 wt % of cellulose fibers derived from natural cellulose having a maximum fiber diameter of 1,500 nm or less, a number average fiber diameter of 200 nm or less and a crystallinity determined by solid state NMR techniques of 60% or more wherein the nonwoven fabric has an average transmittance Tr,av of 0.70 or more, which is defined by the following formula (1) and determined by scanning a light with a wavelength of 850 nm perpendicularly to the nonwoven fabric immersed in toluene, (wherein Tr,av is defined by the following formula (1) with a ratio between Tr,1, an average value of transmittances obtained by filling toluene in a test tube in a condition that the nonwoven fabric is stuck to an inside wall thereof, irradiating a light with a wavelength of 850 nm to the test tube in a direction perpendicular to the nonwoven fabric, and scanning each 40-μm length along the test tube in a lengthwise direction thereof to the total length of 30,000 μm (number of data: 750), and Tr,2, an average value of transmittances obtained by performing the same measurements except that the nonwoven fabric is removed and only toluene is placed in the test tube)

$$Tr,av = Tr,1/Tr,2 \quad (1),$$

wherein the dried nonwoven fabric has a sheet non-uniformity parameter H' of 0.20 or less, which is defined by the following formula (3):

$$H' = T'r,sd/T'r,av \quad (3)$$

(wherein T'r,aV and T'r,sd, respectively, mean an average value and a standard deviation of all Tr values obtained by irradiating a light with a wavelength of 850 nm perpendicular to a dried sheet surface, and measuring Tr for each 40-μm length along the sheet surface in a linear direction thereof to the total length of 30,000 μm (number of data: 750)).

2. The cellulose nonwoven fabric according to claim 1, wherein the average transmittance defined by the above formula (1) is 0.80 or more.

3. The cellulose nonwoven fabric according to either claim 1 or claim 2, wherein the nonwoven fabric has a sheet uniformity parameter H of 0.040 or less, which is defined by the following formula (2), (wherein H is defined by the following formula (2) with Tr,sd defined by a difference between Tr,sd1, a standard deviation of transmittances obtained by filling toluene in a test tube in a condition that the nonwoven fabric is stuck to an inside wall thereof, irradiating a light with a wavelength of 850 nm to the test tube in a direction perpendicular to the nonwoven fabric, and scanning each 40-μm length along the test tube in a lengthwise direction thereof to the total length of 30,000 μm (number of data: 750), and Tr,sd2, a standard deviation of transmittances obtained by performing the same measurements except that the nonwoven fabric is removed and only toluene is placed in the test tube, and Tr,av obtained by the above formula (1) from the measurements)

$$H = Tr,sd/Tr,av \quad (2)$$

wherein Tr,sd=Tr,sd1-Tr,sd2.

4. The cellulose nonwoven fabric according to either claim 1 or claim 2, which comprises cellulose fibers having a nitrogen content of 0.4% by weight or less and a total organic carbon (TOC) content of 60 ppm or less, which is freely present in water 24 hours after 10 g of the fiber is immersed in 100 g of the water at 4° C.

5. The cellulose nonwoven fabric according to claim 4, which comprises cellulose fibers having a chlorine content of 40 ppm or less.

6. The cellulose nonwoven fabric according to claim 4, wherein the natural cellulose is a fine cellulose fiber derived from cotton.

7. The cellulose nonwoven fabric according to claim 4, wherein the natural cellulose is a bacterial cellulose.

8. The cellulose nonwoven fabric according to claim 1, wherein the ingredients other than the cellulose fiber are less than 20% by weight.

\* \* \* \* \*